March 20, 1956 W. G. PFANN 2,739,088
PROCESS FOR CONTROLLING SOLUTE SEGREGATION BY ZONE-MELTING
Filed Nov. 16, 1951 7 Sheets-Sheet 2

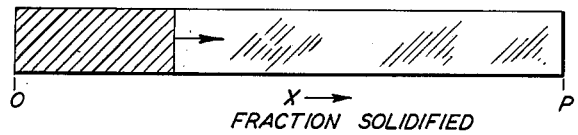
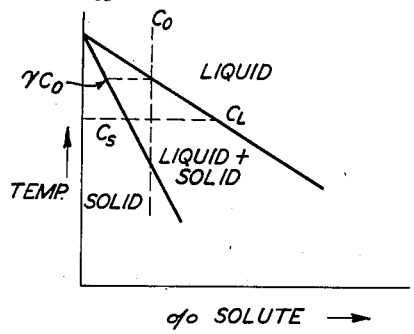
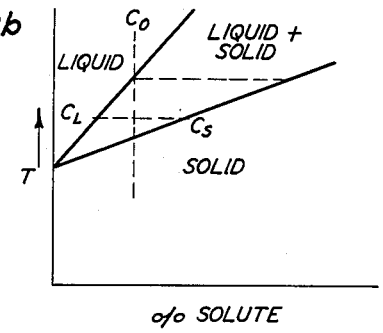
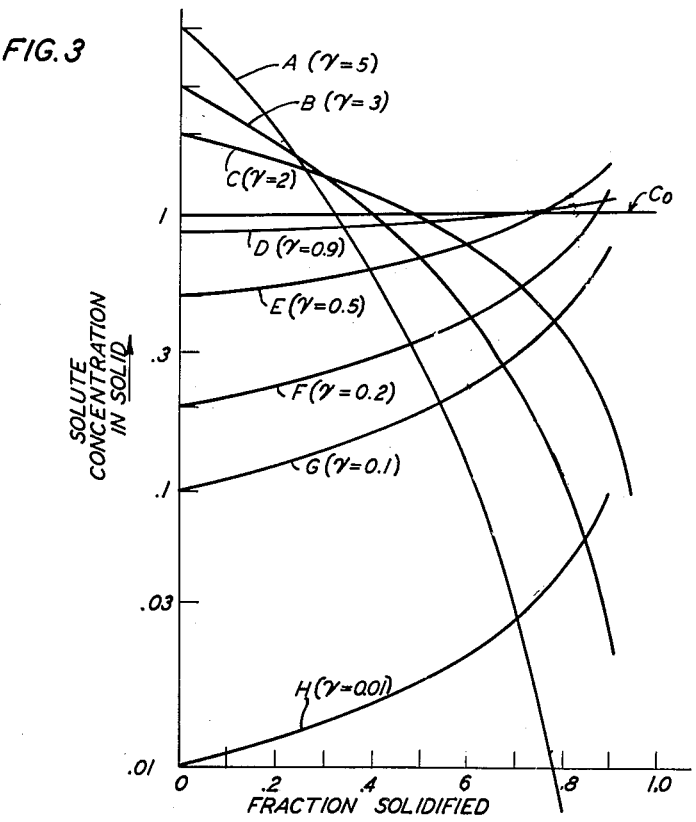

INVENTOR
W. G. PFANN
BY Edwin B. Cave
ATTORNEY

March 20, 1956 W. G. PFANN 2,739,088
PROCESS FOR CONTROLLING SOLUTE SEGREGATION BY ZONE-MELTING
Filed Nov. 16, 1951 7 Sheets-Sheet 4
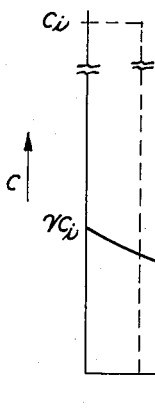
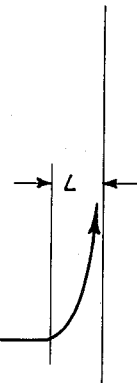
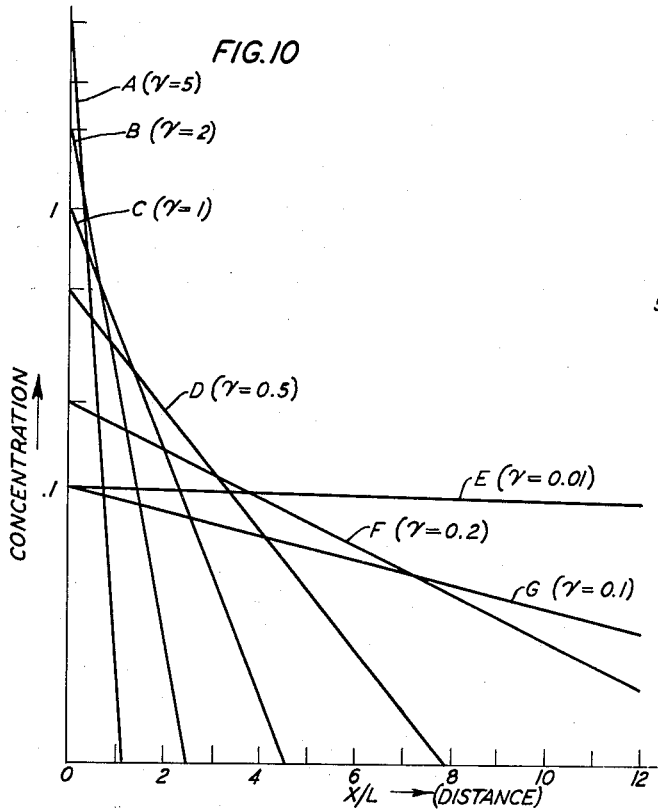
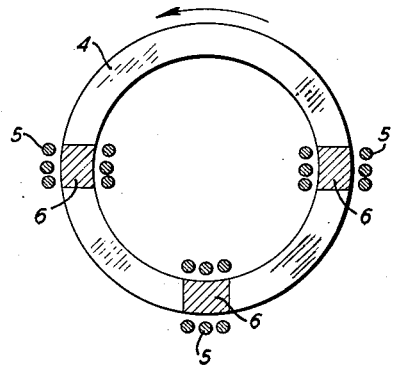
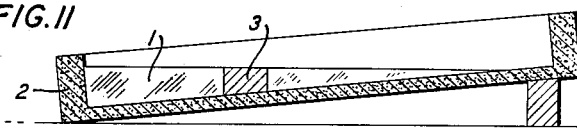
INVENTOR
W.G. PFANN
BY
Edwin B. Cave
ATTORNEY March 20, 1956 W. G. PFANN 2,739,088
PROCESS FOR CONTROLLING SOLUTE SEGREGATION BY ZONE-MELTING
Filed Nov. 16, 1951 7 Sheets-Sheet 5

INVENTOR
W. G. PFANN
BY
Edwin B. Cave
ATTORNEY

March 20, 1956 W. G. PFANN 2,739,088
PROCESS FOR CONTROLLING SOLUTE SEGREGATION BY ZONE-MELTING
Filed Nov. 16, 1951 7 Sheets-Sheet 6

INVENTOR
W. G. PFANN
BY
Edwin B. Cave
ATTORNEY

March 20, 1956  W. G. PFANN  2,739,088
PROCESS FOR CONTROLLING SOLUTE SEGREGATION BY ZONE-MELTING
Filed Nov. 16, 1951  7 Sheets-Sheet 7

INVENTOR
W. G. PFANN
BY
Edwin B. Cave
ATTORNEY

United States Patent Office 2,739,088
Patented Mar. 20, 1956

2,739,088

PROCESS FOR CONTROLLING SOLUTE SEGREGATION BY ZONE-MELTING

William G. Pfann, Basking Ridge, N. J., assignor to Bell Telephone Laboratories, Incorporated, New York, N. Y., a corporation of New York Application November 16, 1951, Serial No. 256,791

31 Claims. (Cl. 148—1.5)

This invention relates to processes for controlling distribution of solutes in solids and between solids and liquids and more specifically to such control processes in metals and their alloys, in salts and in other materials. In one specific embodiment the process of the present invention is applied to refining of and control of conductivity type in semiconductive materials.

The processes described may be utilized for controlling solute distribution in semiconductors so as to produce materials usable in semiconductor amplifiers of the type disclosed in Patent 2,524,035, granted October 3, 1950, to J. Bardeen and W. H. Brattain. The processes described may be adapted to refining materials such as semiconductor materials as, for example, germanium and silicon, so as to produce a degree of purity heretofore unobtainable. The processes generally referred to in this application as "zone-melting" may also be utilized for creating any number of P–N or N–P–N boundaries at any desired location in semiconductive materials. Materials so produced are usable, for example, in the device described in United States Patent No. 2,569,347 of W. Shockley, issued September 25, 1951. In fact the processes described may be utilized in refining or control of solute distribution in any fusible material or in any material in which the solute concentrations in different adjoining phases of the material are different at equilibrium and which phase changes may be brought about thermally and in which the solute diffusivities in the respective phases differ.

Where it is desired to recover solute rather than solvent or any preferred alloy of both, the zone-melting process may be used to concentrate solute at any desired point in the resulting ingot.

The zone-melting process may be carried out in such manner as to produce single crystals while at the same time controlling solute segregation in any of the manners discussed. Crystals superior in quality and size to those produced by other processes may be produced.

In short the process of the present invention as applied to fusible materials generally comprises allowing a small molten zone to traverse a body of solid alloy or other suitable material and progressively refreezing the molten material. The first consequence of freezing in this manner is to produce a distribution of solute which is different from that which would occur were crystallization to proceed from a molten pool by uncontrolled crystallization and which molten material is not replenished as freezing takes place. In zone-melting the molten zone may be considered to be a distributor of solutes in the system since, in moving, it is constantly eating into new solid and thereby changing the composition of the molten portion. The resulting concentration gradient of solute in the end material is different from that which would be produced by normal freezing. As will be shown, the zone-melting process may be utilized in such manner as to produce uniform solute distribution over substantially all of the ingot.

Zone-melting is a remarkably flexible process in that, by appropriate control, the concentration gradient of solute in the end product may be tailored as desired. Solute concentration may be increased or decreased at desired locations in several manners: by varying the size of the molten zone, by varying the rate at which the zone traverses the material, by doping with solid, liquid or gaseous additives and, where diffusion of solute in the molten material is not almost instantaneous, by introducing and varying the rate of stirring in the molten zone, all during the zone-melting process. Further, since it is known that some impurities segregate out faster than others, and since it is also known that in normal freezing procedures some solid solute concentrations are higher in the initial freezing stages while others reach high values, in terms of average solute concentration, only in the final freezing stages, that is to say, some solute solvent systems have gammas ($\gamma$) of less than 1 and some greater than 1, it is possible where the material undergoing treatment contains two or more impurities to cause a preponderance of first the one and then the other, for example, by simply regulating the rate of advance of the zone. Similar effects may be produced by changing the volume of the zone and by introducing and/or varying the rate of stirring in the zone.

In essence, zone-melting is a powerful and flexible method by means of which solutes can be distributed in an unlimited number of useful ways. The products of this process will find use in devices and processes already in use just as in some cases the remarkable flexibility will result in materials of controlled impurity heretofore unobtainable and should give rise to their use in devices which up to this time had their being only in the planning stages.

Wherever the terminology "impurity" or "significant impurity" is used in the description or claims directed to this invention, it is to be understood that reference is being made to a solute of the system there under consideration. Such "impurities" may be desirable or undesirable and, further, may be present or not before the material undergoes treatment. The terminology "significant impurity" or "significant solute" where used in connection with semiconductors has reference to solutes which affect the conductivity type of the semiconductor under consideration. Solutes which have the effect of adding free electrons to the system and therefore tend to effect N-type conductivity are known as donors and those which tend to build up a deficiency of free electrons are known as acceptors. Examples of donors and acceptors for semiconductors of group IV of the periodic table according to the system of Mendelyeev such as, for example, silicon and germanium are, respectively those elements of groups V and III of the same table. See "Electrons and Holes in Semiconductors" by W. Shockley, D. Van Nostrand, 1950.

The semiconductors discussed in the preceding paragraph in which the conductivity type is affected by the quantity and identity of significant solute present are known as "extrinsic semiconductors." The type of conductivity which is introduced by such significant impurities or significant solutes is known as extrinsic conductivity.

The invention can be better understood by reference to the accompanying drawings in which:

Fig. 1 is a graphical representation of a body of material undergoing a normal freezing process, that is, one in which the entire material has been melted and is allowed to freeze out simply by lowering the temperature of the molten body below its freezing point and in which the rate of freezing is sufficiently slow to prevent entrapment of liquid and to allow substantial diffusion of solute in liquid;

Figs. 2a and 2b are equilibrium phase diagrams of materials depicted in Fig. 1, Fig. 2a representing a solute-solvent system undergoing normal freezing and in which the purity of the material frozen out decreases as freezing progresses, that is to say in which γ is less than 1, while Fig. 2b represents such a system in which the major portion of the solute will be found in the initial portion frozen, that is in which γ is greater than 1;

Fig. 3 is a plot of solute concentration against fraction solidified for systems of the type depicted in Figs. 1, 2a and 2b in which the various curves represent different values of γ;

Figure 7A:
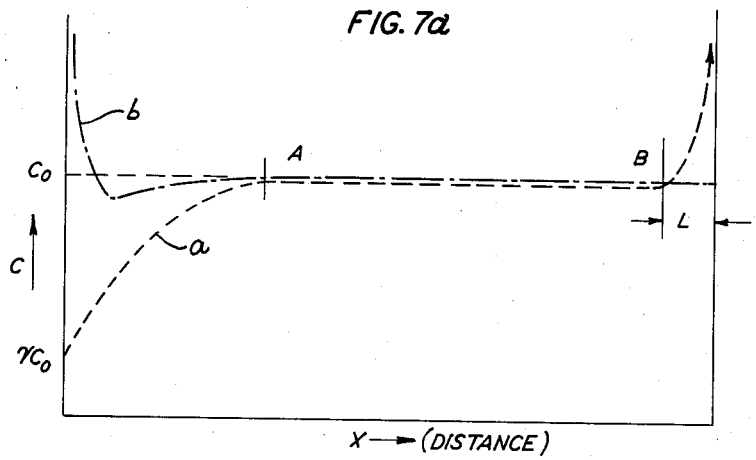
Figure 7B:
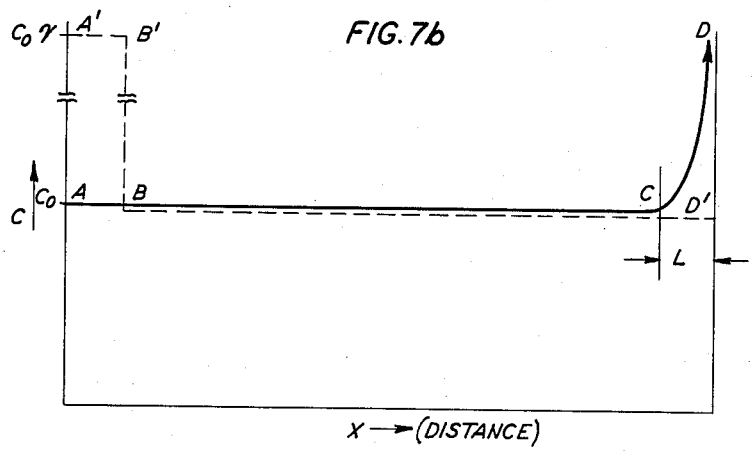
Figure 8:
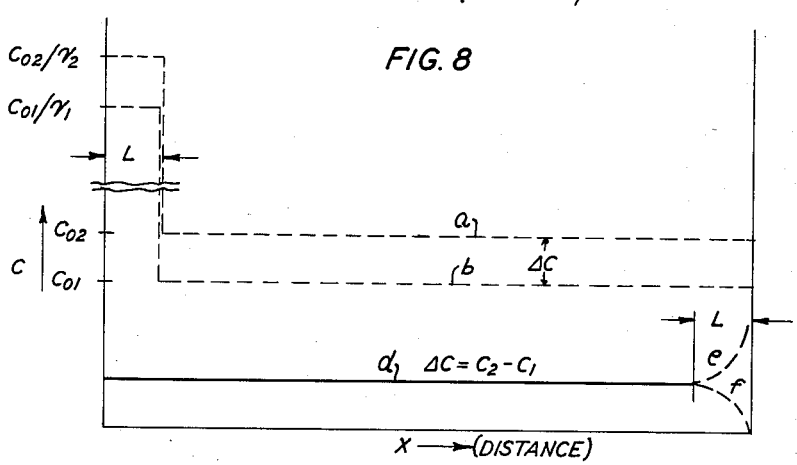
Figure 13A:
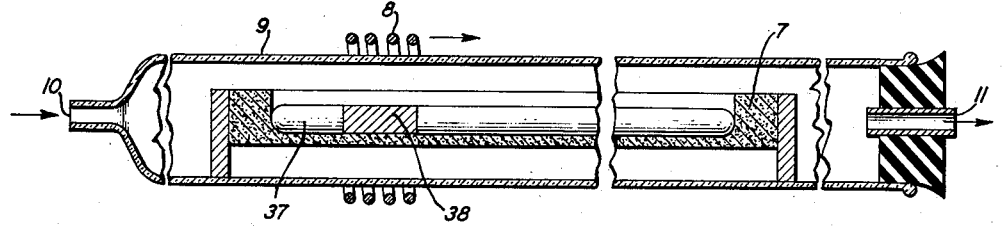
Figure 13B:
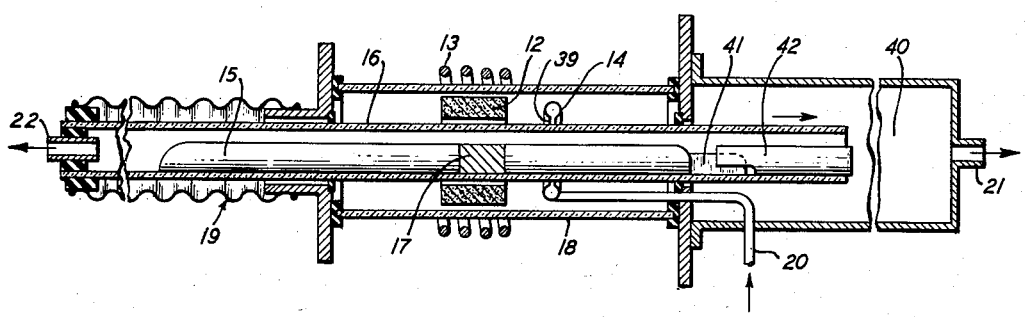
Figure 14A:
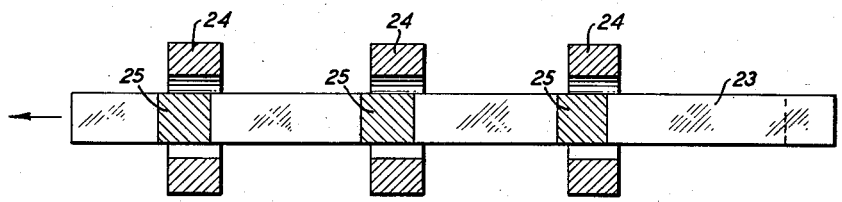
Figure 14B:
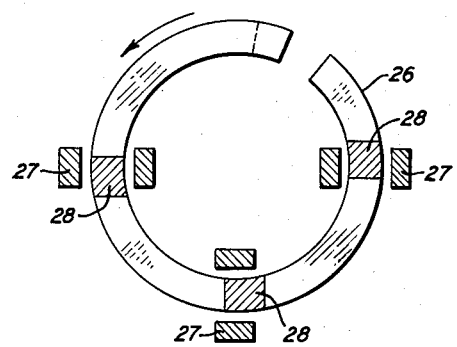
Figure 15:
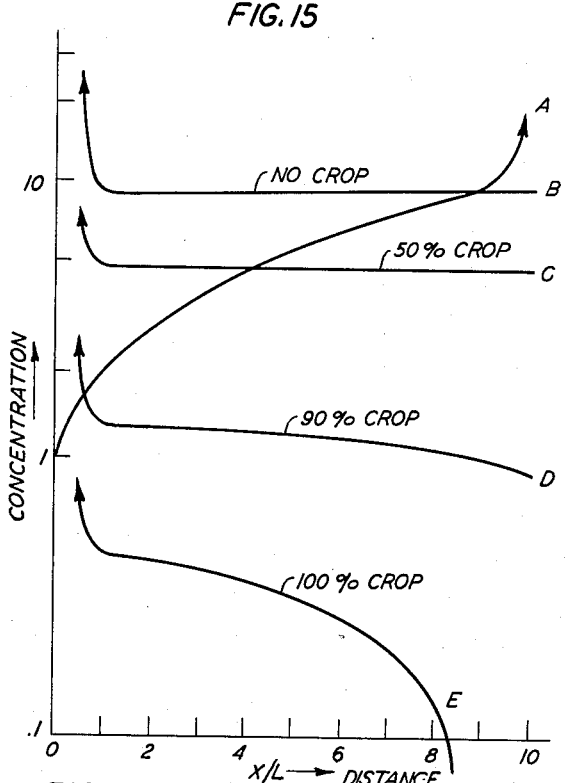
Figure 16A:
Figure 17A:
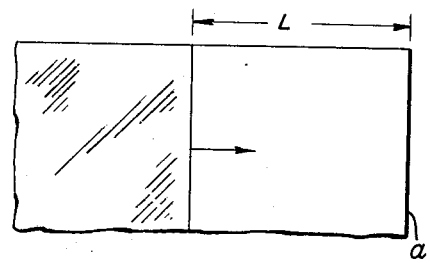
Figure 16B:
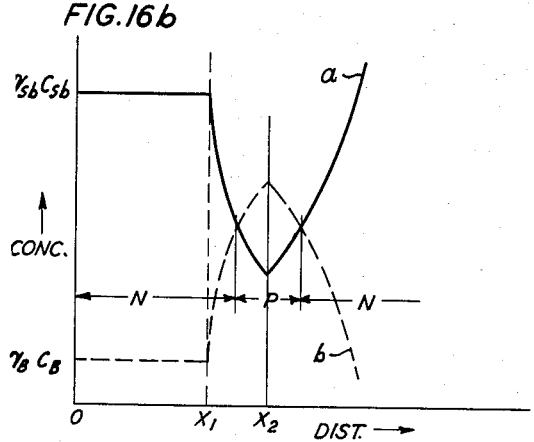
Figure 17B:
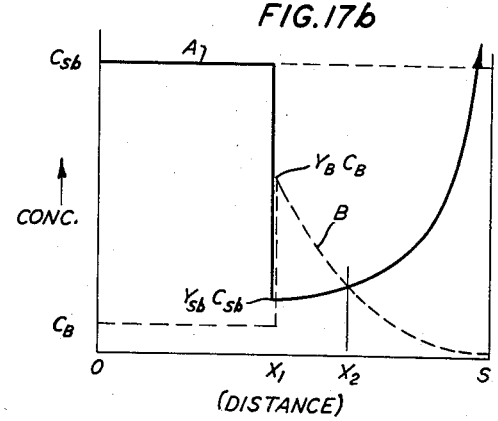
Figure 18A:
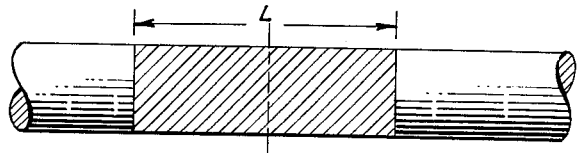
Figure 18B:
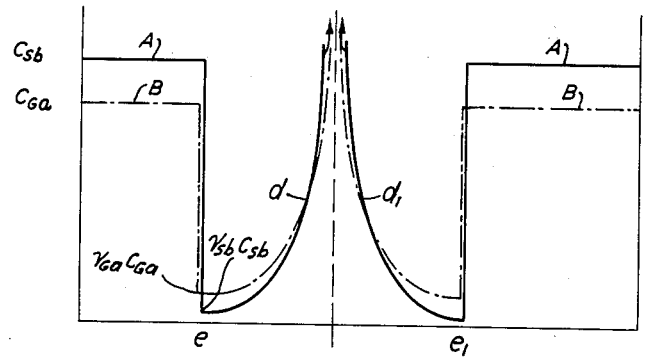
Figure 19A:
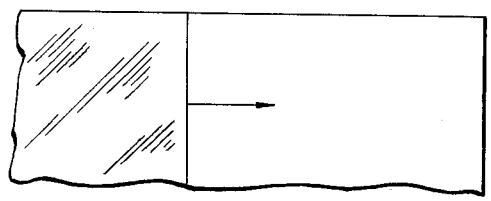
Figure 19B:
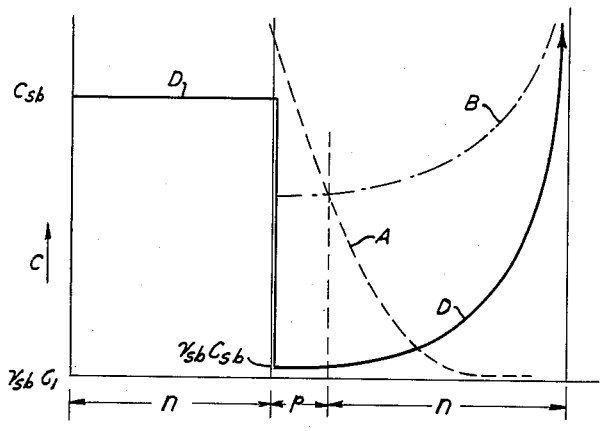
Figure 20:
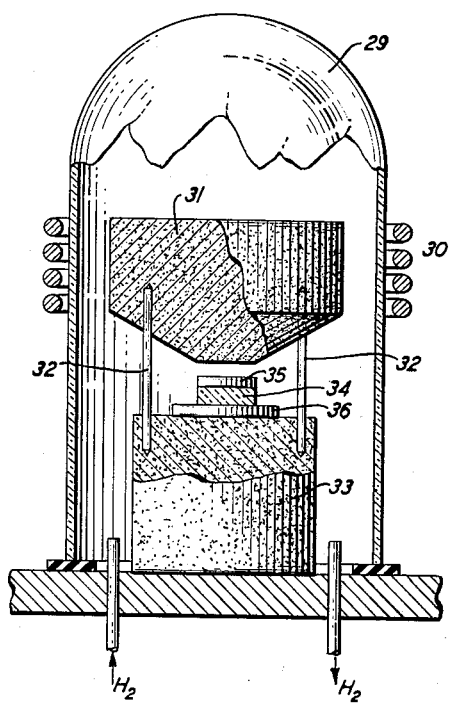

Fig. 7a, on coordinates of concentration and distance, is a representative curve indicating the distribution of solute which may be obtained by use of reverse zone-melting, that is, in which after passing the molten zone through the body in one direction the same process is carried on in a reverse direction;

Fig. 7b, on coordinates of concentration against distance, is a plot of a typical zone-melting process in which a starting charge of additional solute has been added to the initial molten zone of a body already containing this solute;

Fig. 8, plotted on coordinates of concentration and distance, is a plot of a typical zone-melting process with starting charge identical to that depicted in Fig. 7b except that significant amounts of two impurities are present and the additive contains both;

Fig. 9 is a solute segregation curve of the end product of a zone-melting process in which a starting charge of the desired impurity is added to the initial zone but in which the starting material is otherwise substantially free of solute, such modification being herein referred to as "starting charge only";

Fig. 10 is a plot of concentration against distance for various gammas in the process represented by Fig. 9, that is the process of zone-melting with starting charge only;

Fig. 11 is a representation of a zone-melting process in which the volume of the molten zone is varied as freezing progresses;

Fig. 12 is a graphical representation of a body of material undergoing a multiple-pass zone-melting process by which the material is treated in ring form;

Figs. 13a and 13b are sectional views of two types of apparatus which have been used in zone-melting where the body being treated was rod-shaped;

Figs. 14a and 14b are schematic representations of two variations of "zone-refining," that is the process as applied to refining of solvent or concentration of solute;

Fig. 15, on coordinates of concentration and distance, is a plot of the characteristics of a body of material which has undergone reverse zone-melting and in which curves B through E represent material in which portions of the final zone containing increasing percentages of solute in said zone were cropped before reversing direction;

Figs. 16a and 16b are, respectively, schematic and graphical representations of a zone-melting process utilizing differential segregation of two significant impurities in a semi-conductive material to produce an N-P-N transition region;

Figs. 17a and 17b are schematic and graphical representations of a variation of zone-melting in which the zone is moved inward upon the surface of the material to some desired depth always increasing its length so that the surface of the material remains molten and in which the material is then frozen in the reverse direction;

Figs. 18a and 18b are schematic and graphical representations of a "remelt zone" produced by zone-melting but in which freezing proceeded from the two solid-liquid interfaces inwardly until the entire zone was refrozen;

Figs. 19a and 19b are schematic and graphical representations of a process identical to that of Figs. 17a and 17b but in which there was an addition of impurity to the melted portion; and Fig. 20 is a sectional view of one type of apparatus on which the zone-melting processes of Figs. 17a and 17b and 19a and 19b may be carried out.

Referring again to Fig. 1, the body depicted is a cylinder of molten alloy which is being allowed to freeze unidirectionally from one end, O, to the other, P, at a rate sufficiently slow to prevent entrapment of liquid and to permit substantial diffusion of solute in the liquid. This is the manner of freezing which is referred to as normal freezing. The result under most conditions will be a segregation action which will concentrate the solute in one or the other end of the body. If the equilibrium phase diagram for the system is that of Fig. 2a, then the distribution coefficient γ, defined as the ratio of the concentration of solute in the freezing solid, $C_s$, to that in the liquid, $C_L$, will be less than 1, and the solute will be concentrated in the last region to freeze. If the solute raises the freezing point, as in Fig. 2b, then γ is greater than 1 and the solute will be concentrated near the starting end. $C_0$ in both figures is the mean solute concentration in the starting material. The concentration in the solid at any point $x$ on Fig. 1 where $x$ is the fraction which has been solidified can be expressed by the relation:

$$C = \gamma C_0 (1-x)^{\gamma-1} \qquad (1)$$

the derivation of which equation may be found in Transactions of the American Institute of Mining and Metallurgical Engineers, volume 135, page 85 (1939) by A. Hayes and J. Chipman. Equation 1 is based on the following assumptions:

(a) Diffusion in the solid is negligible
(b) Diffusion in the liquid is rapid
(c) γ is constant.

For systems in which the γ value of the solute in the solvent is less than 1, the smallest possible γ value is that which is calculated from the phase diagram of Fig. 2a. For systems in which the γ value is greater than 1, the theoretical value calculated from the phase diagram of Fig. 2b represents the maximum value. These theoretical values are all calculated on the presumption that there is little or no diffusion in the solid state and that diffusion in the liquid state is complete. The effect of diffusion in the solid state, or the lack of it in the liquid state, is to cause γ values to approach 1. Other factors which affect gamma values through affecting diffusion in the liquid are as follows:

(a) Stirring has the effect of increasing diffusion in the liquid state and, therefore, of causing the actual value of γ of the system under consideration to approach its theoretical value.

(b) Formation of dendrites has the effect of decreasing diffusion in the liquid state and, therefore, of causing γ values of the system under consideration to approach 1. Also, increasing the rate of advance of the solid-liquid interface will increase γ for values less than 1 and decrease γ for values greater than 1. Such factors have been discussed in the aforementioned paper by A. Hayes and J. Chipman.

(c) It would appear that the higher the temperature gradient from the liquid zone to the solid material the higher the effective rate of diffusion in the liquid state. This, therefore, would also have the effect of causing the gamma value of the system under consideration to approach a theoretical value on the equilibrium diagram of Fig. 3.

Fig. 3 is a plot of calculated solute concentration against fraction solidified for a rod subjected to normal freezing as shown in Fig. 1. Curves are shown for each of the parameters A through H which represent gamma values of 5, 3, 2, 0.9, 0.5, 0.2, 0.1 and 0.01, respectively. These curves were calculated from Equation 1 above. $C_0$, the mean solute concentration for the material, is represented at a value of 1 on the vertical coordinate. The other concentration values are represented (on a logarithmic scale) as fractions or multiples of $C_0$. From these curves one may draw the following conclusions:

(a) The greater the absolute value of $(1-\gamma)$, the greater are the extremes of concentration produced by segregation; that is to say, the smaller the gamma where gamma is less than 1 and the larger the value of gamma where gamma is greater than 1, the greater is the difference between the mean solute concentration $C_0$ and the concentration of solute in the initial portion to freeze out $\gamma C_0$.

(b) For values of $\gamma$ less than 1, lower $\gamma$ corresponds to faster segregation. That is, if the curves for two solutes are compared at equal concentrations and the same fraction solidified, that having the lower $\gamma$ will have the greater slope, $dc/dx$, at all points. For the purpose of such a comparison the curves may be shifted vertically without any change in shape until they intersect at any given concentration or fraction solidified since concentration has been plotted logarithmically. For $\gamma$'s greater than 1, smaller $\gamma$ corresponds to slower segregation with $dc/dx$ being negative.

(c) For gammas of a value approximately equal to 0.1 the concentration increases by a factor of about 8 in the first 9/10 of the ingot solidified.

Further examination of the plotted curves of Fig. 3 reveals that the percentage increase in the solute concentration over that at $x=0$ in the first 0.9 of the ingot is relatively insensitive to the value of $\gamma$ for values in the range from about 0.01 to about 0.2. This is very important since this range of values represents the gamma magnitudes of certain solutes (significant impurities) presently used in germanium semiconductors. Examples are acceptor impurities aluminum and gallium with $\gamma$'s of about 0.07, and 0.12, respectively, and donor impurity arsenic with a $\gamma$ of about 0.07.

It should be noted that Equation 1 may be applicable to substantially all of the ingot but never to the complete ingot since, according to this equation, for $\gamma$'s less than 1 the concentration approaches infinity as X approaches 1. For any physical alloy one of two alternatives must occur at some point during the freezing process:

(a) An eutectic or peritectic point must be reached by the liquid with a resultant appearance of a second phase in a solid, or (b) If the system has complete solubility in the solid, and hence a second phase cannot appear, $\gamma$ will change with composition until it reaches unity, which it will do at $x=1$ just as the last drop freezes.

As has been shown by the above considerations, normal freezing, especially for very large or very small values of $\gamma$, produces a variation in solute concentration over the entire ingot in the direction in which freezing progressed. One of the features of zone-melting is the ability to substantially eliminate these variations. Also, where two solutes are present, the concentration differential $\Delta C$ may be kept constant by zone-melting whereas this result may not be achieved by normal freezing.

Figure 4:
Fig. 4 is a graphical representation of a body of material undergoing a simple zone-melting process.

A simple zone-melting process is to cause a small molten region or zone to traverse a relatively long rod or charge of solid alloy at a substantially uniform rate of travel as shown in Fig. 4. In this figure L represents the length of the molten zone, X represents that portion of the solid which has already been traversed by the molten zone and which therefore is solid, the direction of movement of the molten zone is into the solid of mean solute concentration $C_0$.

One sequence of freezing in this manner is a distribution of solute which is quite different from normal freezing. The course of segregation during simple single-pass zone-melting may be visualized with the aid of Fig. 5 which is a plot of concentration against distance for a system in which $\gamma$ is less than 1. In plotting Fig. 5, in addition to the assumptions made in the above discussion of normal freezing, the fourth assumption that L, the length of the molten zone, remains constant in an ingot of constant cross-section has been made. Situations in which it proves advantageous to vary the length or otherwise vary the volume of zone L will be discussed further on.

Figure 5:
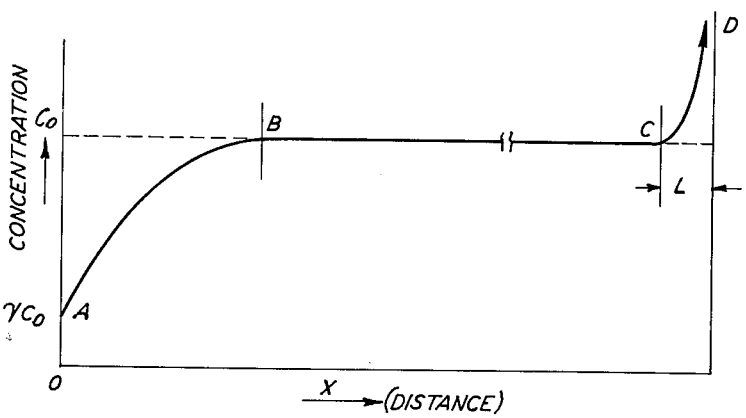
Fig. 5 is a plot of solute concentration in the solid against distance and indicates one type of solute distribution which may be obtained in the body of Fig. 4 by use of single-pass zone-melting.

In Fig. 4 the mean concentration $C_0$ of the charge has been arranged to be uniform on a macroscale. Means of obtaining such starting material are described further on. Referring to Fig. 5, as the molten zone of constant length L advances from left to right at a substantially uniform rate in a bar of constant cross-section and as it freezes out a layer $dx$ and melts a layer $dx$ of the charge, the first solid to freeze out at $x=0$ is of concentration $C_1 = \gamma C_0$. Since $\gamma$ is less than 1 and $C_1$ is more dilute than $C_0$ the liquid is enriched. As freezing progresses from A to B the liquid continues to be enriched, although at a decreasing rate, until the molten zone attains the concentration $C_0/\gamma$ at point B. At this point in the process the freezing solid has the same concentration of solute as the melting solid, hence the concentration of liquid remains constant at $C_0/\gamma$. This is considered to be a steady state condition and the concentration of the freezing solid will be maintained constant at concentration $C_0$ until point C which is one zone length L distant from the end D of the ingot. At point C, since there is no new solid to eat into, the entire portion of this last molten zone solidifies by normal freezing and the curve CD follows that which would be anticipated by Equation 1.

Thus, as may be seen from Fig. 5, simple zone-melting of a uniform charge results in an initial transition region during which concentration of solute in the liquid zone progressively approaches the equilibrium concentration $C_0/\gamma$, a region of uniform concentration $C_0/\gamma$ in the liquid and $C_0$ in the solid, the length of which, expressed in zone lengths, is prescribed only by the length of the starting charge, and a region one zone-length long in which normal freezing prevails.

The process which has been described above has been put into mathematical terms and where the assumptions stated are made, the concentration C of the solute at any point X in a zone-melted rod may be determined from the relationship:

$$C/C_0 = 1 - (1-\gamma)e^{-\gamma X/L} \qquad (2)$$

where:

$C_0$ is the mean concentration of the charge,
L is the length of the molten zone,
$\gamma$ is the distribution coefficient defined above, and
X/L is the distance from the starting end expressed in zone-lengths (note that X is not the fraction solidified as it was in Equation 1).

Figure 6:
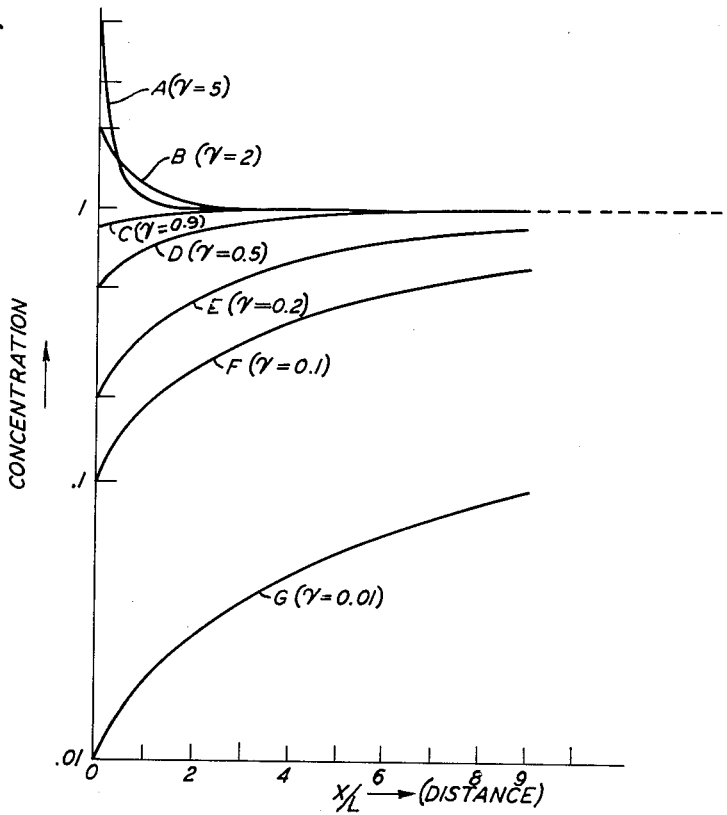
Fig. 6 is a plot of concentration against distances in which the various curves represent various values of γ and indicate the nature of solute distribution which may be expected by single-pass zone-melting.

Fig. 6 is a plot (calculated from Equation 2) of concentration against X/L (the distance the molten zone has traversed is expressed in terms of zone-lengths, L) and on which the parameter is $\gamma$. Curves A through G represent respectively $\gamma$'s of 5, 2, 0.9, 0.5, 0.2, 0.1, 0.01, respectively. The process plotted in single-pass zone-melting in which a zone of constant length travels at a substantially uniform rate in which the starting material is 10 zone-lengths long and of uniform cross-section. Only 9 zone-lengths are depicted since the tenth solidifies by normal freezing.

Examination of the curves of Fig. 6 will reveal that:

(a) As $\gamma$ increases, C, the local solute concentration of the solid traversed, approaches equality with $C_0$ at lower values of X/L. For a given value of $\gamma$, decreasing L will have the effect of causing C to approach equality with $C_0$ at a smaller value of X.

(b) As may be seen from curves F and G of Fig. 6, for $\gamma$ values of about 0.1 or less the rod is not at all uniform for the indicated rod-length of 10 zone-lengths.

(c) The difference between initial and mean concentrations is proportional to $(1-\gamma)$ as in normal freezing.

(d) For a given value of gamma the percentage of uniform material can be increased by increasing the length of the rod and/or by reducing the length, L, of the molten zone.

(e) It should be noted that while Equation 2 and the curves of Fig. 6 are based on the four assumptions above made concerning the process, the basic feature of the zone-melting process, that is, the attainment of a limiting composition $C_0$ is relatively independent of these assumptions. However, fluctuations in either $\gamma$ or L after the limiting composition has been reached will cause variations of composition.

The number of molten zone-lengths which is necessary for C to approach equilibrium concentration $C_0$ is shown in Table 1 for various values of $\gamma$, the boundary of the region being taken where $C=0.9\ C_0$. It is evident that for a body of about 20 zone-lengths in length simple zone-melting is not a very effective way of getting uniform composition if $\gamma$ is less than about 0.2.

TABLE 1

*Zone-lengths traversed to approach equilibrium*

| $\gamma$: | X/L |
|---|---|
| 0.9 | 0 |
| 0.5 | 3.2 |
| 0.1 | 22 |
| 0.01 | 230 |
| 0.001 | 2300 |

As has been seen from the above discussion and from Fig. 5, simple single-pass zone-melting of a uniform charge results in two end regions in which the concentration deviates from the mean composition. Fig. 7a represents a means of minimizing this deviation. The process here depicted is known as "reverse zone-melting." Where C has substantially attained the value $C_0$ at some point in the original run as in Fig. 7a, curve a, then zone-melting in the reverse direction at a uniform rate of travel will produce the approximate distribution of solute shown by curve b of the same figure (the two curves are essentially identical and of constant value $C_0$ over range AB). It is seen the deviation at the right, that is, that portion of the rod which on single-pass zone-melting froze by normal freezing, has been eliminated, while the deviation in the initial portion of the rod has been reduced.

If $\gamma$ is very small, of the order of 0.01 (as it is in several of the germanium alloys now used in the construction of semiconductive devices such as germanium transistors and rectifiers) then the initial distribution will be quite non-uniform as may be seen from curve G of Fig. 6 and $C_0$ will not be attained by single-pass zone-melting in molds of 10 or 20 zone-lengths except, at one point, in that portion of the rod which is allowed to crystallize by normal freezing. Analytically it would not be expected that any part of such a rod would become of exactly uniform concentration upon reverse zone-melting. However, as will later be shown, in connection with Fig. 10, under such conditions the variations in concentration will nevertheless be quite small and reverse zone-melting will result in an essentially uniform solute distribution.

One satisfactory means for eliminating the initial transition region is by utilizing a starting charge. This is the process of Fig. 7b. The technique is that of adding sufficient significant impurity to the first molten zone so as to bring the concentration of that zone up to $C_0/\gamma$, the conditions thereafter being similar to those of the process of Fig. 5. When this is done the concentration of the first portion of the solid to freeze is $C_0$. Concentration of solute in the alloy crystallizing out will remain at that value until the last molten zone begins to freeze. The solid curve ABCD of Fig. 7b represents the final ingot while the broken line is the composition of the starting materials A'B'B is the charge added to the first molten zone to bring the liquid concentrations to $C_0/\gamma$ and the rest of the material being at level $C_0$ on a macro scale. Again the curves are drawn separately over range BC only for purposes of clarity.

Where it is desired to produce an alloy containing two solutes and with a constant concentration differential, $\Delta C$, the process of Fig. 8 may be used. The only assumption made here in addition to those made above is that the $\gamma$'s for the two solutes be independent. This assumption is a reasonable one where the total concentration of the two solutes is slight. Here the process of Fig. 7b, that is zone-melting with starting charge, is used. However, here it is necessary to use a sufficient amount of each solute to bring the level of each up to $C_0/\gamma$ in the first molten zone. In Fig. 8 the solute concentrations of the starting materials are represented by curves a and b. Since it has been assumed that the $\gamma$'s are independent, each concentration level will be identical in form to that for Fig. 7b, and, consequently, the concentration, $\Delta C$, will be a constant in all but the last zone. This is shown on the plot as curve d. It will be noted that this curve is of constant value except in the last zone where its value may increase, decrease or stay constant depending on the normal freezing characteristics of the two solutes, 1 and 2, which may be predicted from Equation 1. Two such possible course are shown by dotted portions e and f.

The value of such a process as that depicted by Fig. 8 is of value especially when applied to the field of semiconductors. Here it is always important to control resistivity, and since this quantity depends only on $\Delta C$ of the donors and acceptors, it is possible to produce controlled resistivity product from less pure and, consequently, less expensive starting material. By using the zone-melting process of this invention, it is possible to produce material having any resistivity, or $\Delta C$, while independently specifying the total amount of solute to be present, all on a microscale. So far as is known this cannot be done by any other process. Further, the product produced by this species of zone-melting finds use as a starting material in the preparation of "remelt junctions" described in connection with Figs. 16 through 19.

It should be noted that even where the $\gamma$'s of the two solutes are not independent, an end product with a constant $\Delta C$ may still be prepared by varying the amounts of each in the starting charge so as to bring the molten zone to the effective value of $C_0/\gamma$, the value of the $\gamma$'s for the system being determined empirically.

Fig. 9 is a graphical representation of zone-melting with starting charge in which the initial material is substantially pure and in which substantially all the solute is added in the charge which is put into the first molten zone. When such a charge of concentration $C_i$ is added to the first zone and where the zone of constant length L is then allowed to traverse pure solvent in the form of a bar of uniform cross-section at a substantially uniform rate, the process is here referred to as zone-melting with "starting charge only." In such a run, if a molten zone of length L is passed through the rod as in Fig. 9, the concentration of solute in all but the last zone-length will decay exponentially as given by the equation:

$$C=\gamma C_i e^{-\gamma X/L} \qquad (3)$$

Fig. 10, on coordinates of concentration and distance and with a parameter of $\gamma$, is a plot of starting-charge-only for runs as discussed in connection with Fig. 9 above. On the semi-log plot which is used, the plotted curves are straight lines. On this plot, curves A, B, C, D, F and G, for a starting charge of concentration, $C_i$, equal to one unit, represent respectively gamma values of 5, 2, 1, 0.5, 0.2 and 0.1 for zone-melting into pure solvent. Curve E represents a starting charge $C_i$ equal to 10 units for a $\gamma$ of 0.01. It may be noted from this plot that:

(a) Concentration decreases exponentially with increasing X/L for all values of $\gamma$ in contrast with Figs. 3 and 6 in which concentration increased with distance for $\gamma$ values of less than one.

(b) Low $\gamma$ corresponds to a high degree of uniformity. For example, for $\gamma=0.01$, which is of the order of that for antimony in germanium, the concentration falls from its initial value only 10 per cent in nine zone-lengths. Hence the concentration of 90 per cent of the rod 10 zone-lengths long is constant within ±5 per cent.

(c) A $\gamma$ which approaches 1 in value does not produce improved uniformity of segregation as it does in normal freezing.

It was mentioned, in connection with the discussion of reverse zone melting, that reverse melting of a system in which $\gamma$ of the solute is of the order of 0.01 would result in essentially uniform solute distribution. Referring now to curve G of Fig. 6, it is seen that where with $\gamma$ equal to 0.01, $C_0$ equal to 1, somewhat less than one-tenth of the total solute present in the starting material crystallizes out in the first nine-tenths of the body treated by single-pass zone-melting. It follows, then, that more than nine-tenths of the solute is present in the last zone. Therefore, reverse zone-melting, in this instance, is an approximation of starting-charge-only zone-melting where $\gamma$ is equal to 0.01 and the reverse curve should be almost identical to curve E of Fig. 10 which curve teaches that where the $\gamma$ is of this order, the rate of decay is substantially small, thereby producing uniform solute distribution.

Thus the very solutes which segregate most severely in simple single-pass zone-melting (Equation 2), that is, those having low values of $\gamma$ (of the order of those values which have been computed for the semiconductor systems of gallium, arsenic and antimony in germanium) give the least difficulty when zone-melted into pure solvent. Conversely, solutes having gammas greater than 1, which quickly attain the equilibrium concentration in simple zone-melting, produce an alloy having a severe concentration gradient when zone-melted into pure solvent. Those solutes having intermediate gammas, that is, of the value of from 0.1 to 0.3 are not particularly favored by either process and for such the methods of Figs. 7a and 7b are preferred.

Still greater uniformity can be obtained for gammas less than about 0.2 by zone-melting into pure solvent while reducing V, the volume of the zone, as the molten zone progresses along the charge. One such process, in which V is varied by varying the cross-section of the molten zone, is represented schematically by Fig. 11. In this figure material 1 being treated is contained in inclined mold 2. The molten zone traversing this material is represented by the hatched area 3. This process is a variant of the process of Figs. 9 and 10. By reducing V as freezing progresses, it is possible to obtain uniform solute distribution in a single pass. In this way, even though solute is continually being lost by the molten zone, the decrease in volume of the zone maintains the concentration therein at a constant value, and hence the solid freezing-out has constant composition. The expression for the variation of V is:

$$V = V_0 - \gamma \int_0^x A(X) dx \qquad (4A)$$

in which:

$V_0$ = the initial zone volume
$A$ = the cross-sectional area of the freezing interface of the zone.

For the system in which A is constant, that is, for constant cross-sectional area, the expression reduces to the following:

$$L = L_0 - \gamma X \qquad (4B)$$

in which:

$L$ = length of the zone
$L_0$ = the initial zone length

For a system in which A is constant the concentration in the solid will be:

$$C = \gamma C_i \qquad (5)$$

where $C_i = S/V$, S being total solute (all in first molten zone), V being the volume of the zone.

Two illustrative methods of varying V are as follows:

(a) The method of Fig. 11 in which zone length is held constant but the charge is provided with a cross-section the area of which varies according to Equation 4A.

(b) For a bar of constant cross-section the length of the zone may be decreased by reducing the heating power, increasing the cooling rate at the trailing interface, or increasing the rate at which the zone traverses the rod.

For a system in which the cross-sectional area of a zone remains constant, the limit of X to which this method, that is, zone-melting into pure solvent with varying zone volume, can be followed, is given by the condition $V=0$ which occurs at $X_{limit}$, where $$X_{limit} = V_0/\gamma$$

Thus, for example, for $\gamma$ equal to 0.01, $X_{limit}$ equals one hundred zone volumes in terms of $V_0$ (initial zone volume) where:

$\gamma = 0.1$
$X_{limit} = 10$ zone volumes.

Fig. 12 is a schematic representation of an expeditious method of obtaining multipass zone-melting. In this type of run, the charge is arranged in a closed ring 4 which rotates in its own plane about its center. One or more stationary heaters 5 (three are depicted) such as induction coils, rings heated inductively, or resistance-wire coils, form a corresponding number of molten zones 6. As the ring rotates, in effect the molten zones travel around the ring, thereby traversing the material, the same effect can be obtained by repeated back and forth passes of a molten zone in a straight bar.

For any initial distribution of solute, after a sufficient number of rotations the portion which at any instant is solid will have a uniform concentration $C_f$ while the molten zone or zones will have a concentration $C_f/\gamma$, where $\gamma$ is the distribution coefficient above defined. Heating can be by arcs, ion or electron discharges or torches or can be effected more directly by immersing the heating element into the molten material.

Assuming unit cross-section, such a process follows the following relationship:

$$\frac{C_i}{C_f} = R = 1 + \frac{L(1-\gamma)}{T\gamma} \qquad (6)$$

in which:

$T$ = total length of the body of starting material traversed
$L$ = total length of molten zones (in same units as T)
$C_i$ = mean initial concentration.

*Note.*—This quantity could be represented as $C_0$ but the latter symbol has been used only where solute concentration is uniform on at least a macroscale. In multiple-pass zone-melting the end product is independent of the initial distribution.

It is evident from the above relationship that this process is a refining method if $\gamma$ is quite small. For example, for $\gamma=0.007$, $T=20$, $L=2$, where both T and L are expressed in the same units:

$$R = 1 + \frac{(2)(.993)}{(20)(.007)} = 15.2$$

Thus the final solute concentration in all but the final zone or zones is, under these conditions, reduced to one-fifteenth of the solute concentration in the initial material.

Fig. 13a is a cross-sectional view of one type of apparatus which has proved satisfactory for zone-melting bars of material as above described. The starting material 37 is placed in a stationary graphite mold 7 about twelve inches long with an inside width of about 3/8 inch which is traversed by moving induction coil 8. This coil is connected to a suitable source (not shown) of high frequency current. Suitable means (not shown) are provided for moving coil 8 at any desired rate along tube 9. In this apparatus, the mold, made of graphite, is inside of a tube 9 made of suitable material such as fused quartz containing gas intake 10 and outlet 11, through which hydrogen or some other suitable gas is passed. That portion of mold 7 within coil 8 at any instant is inductively heated by that coil to a temperature sufficient to melt the material in zone 38. The nature of the gas and the effects which it has on the system and the manner in which the rate of travel and the size of the molten zone may be varied are discussed more fully below. While this arrangement is satisfactory in so far as zone-melting is concerned, single crystals are more easily obtainable from the apparatus shown in Fig. 13b.

In the apparatus of Fig. 13b, a ring heater 12 of graphite about one inch in length is used. Ring heater 12 is heated inductively by induction coil 13 which is connected to a source of high frequency current (not shown). The heater 12 and induction coil 13 are stationary and the starting material 15 is moved through the heater in tube or boat 16 of quartz or other suitable material. The heat from heater ring 12 is sufficient to produce molten zone 17 in the starting material in the vicinity of the heater. Cooling ring 14 is provided adjacent to heater ring 12 and surrounding tube 16 and is placed so that the material is cooled after passing through heating ring 12. An atmosphere of hydrogen or other suitable gas, as will be discussed more fully below, is maintained in the apparatus. Cooling is accomplished by introducing this gas by means of gas inlet 20 through cooling ring 14 into the interior of tube 18. The inner periphery of ring 14 is provided with a slot 39 through which the gas emerges and impinges on tube 16. This gas then seeps into chamber 40 from which a portion emerges through outlet 21 and the remainder passes through tube 16 and emerges through outlet 22. If desired the crystal may be formed on seed crystal 41 or directly on holder 42. The possibility of using a seed crystal will be discussed more fully later. Molten zones as short as one-half inch in length are easily obtainable in this apparatus when zone-melting germanium alloys. The entire assembly is contained in a quartz container 18 and the junction between the moving tube 16 and the stationary tube 18 is maintained by rubber seal 19. The rate at which tube 16 is continually moved through heating ring 12 and the resultant rate at which the zone traverses the body of material being treated together with the effect of varying this rate will be discussed later. If desired, independent atmospheres may be maintained within boat 16 and within heating chamber 18. This design has the advantage of having a large temperature gradient at the liquid-solid interface.

In the mechanism of Fig. 13b where the material being treated is germanium and where high purity is desired, it has been found satisfactory to pass hydrogen through the cooling ring at a rate of about 18 liters per minute and at a lower rate over the germanium itself. One purpose of the hydrogen flow over the germanium in this instance is to prevent air leaks. A flow rate of about one or two liters per minute in a tube of one-half inch to one and one-half inch bore is satisfactory for this purpose.

Using the apparatus of Fig. 13b, single crystals of N-type germanium about twelve inches in length and over 300 grams in weight have been produced. Life times of injected carriers as high as 1000 microseconds have been observed in specimens so produced.

While it is evident that any of the processes above described will have a refining effect, this effect increasing with decreasing values of $\gamma$ for $\gamma$'s less than 1 and with increasing values of $\gamma$ for $\gamma$'s greater than 1, a more effective refining action is obtained by using one of the zone-melting processes designed for this purpose. Two such are represented by Figs. 14a and 14b. Fig. 14a is a sectional representation of a zone-refining process in which the starting material 23 is in bar form and in which the bar is passed through one or more ring heaters 24 which may be of the type described in connection with Fig. 13b. By having the charge in bar form and passing it through several ring heaters, a multiplicity of molten zones 25 traverse a charge in one operation. If $\gamma$ is less than 1, each zone picks up solute and deposits it at or near the end of the bar.

Heretofore purification has been generally accomplished by repeated fractional crystallizations. By such a process the ingot is frozen by normal freezing and that portion of the ingot containing the major portion of the impurity is cropped (for solute-solvent systems in which $\gamma$ of the solute is less than 1, this is the last portion of the ingot to freeze). By a repetition of such steps a high degree of refining is possible. However, zone-refining saves time by eliminating the cropping steps and by reducing the melting and freezing times. Moreover, the power consumption is less, and the total time liquid is in contact with mold or atmosphere is less (the latter minimizing contamination). Further refining action may be had by the apparatus of Fig. 14a if the bar is repeatedly passed through the heaters in the original direction. This may be done any number of times until the theoretical ultimate solute distribution is reached. This ultimate limit may be computed from the following equation:

$$C = Ae^{KX}$$

where $$\gamma = \frac{KL}{e^{KL}-1} \quad (7)$$

$$A = \frac{TC_0K}{e^{KT}-1}$$

in which $L$=length of molten zone $C_0$=mean solute concentration in charge, not necessarily assumed to be uniform $T$=total length of starting material expressed in the same units as L.

Cross-section assumed to be unity.

When $\gamma=0.1$, and $L=1$, K will be equal to 3.6. Hence, it is evident that a very steep concentration gradient will be produced and that extremely low concentrations will result in a large part of the bar.

A zone-refining process which bears the same relation to the process of Fig. 14a, as Fig. 12 does to Fig. 4, is that of 14b. In this process, a toroidal body of material 26 in the form of an open ring is allowed to travel about its own axis through any desired number of ring heaters 27, thereby producing molten zones 28. This is one manner of obtaining multipass zone-refining with a minimum of expense and complexity.

Fig. 15 is a plot of concentration against distance in zone lengths for a $\gamma$ value of 0.01 and represents the process of reverse zone-melting as discussed in connection with Fig. 7a but in which all or part of the final zone is cropped after the initial pass and before the reverse run. On this plot, curve A represents the original run in a forward direction while curves B, C, D, G represent four reverse runs on material having the properties of curve A and in which portions of the last zone containing respectively 0, 50, 90 and 100 percent of the solute in the last zone were removed after the forward run. This process is particularly effective for solvents in which the solute has a $\gamma$ of 0.1 or less and for charges about ten zone lengths long. The starting charge, assumed to be of uniform concentration $C_0 = 100$ on a macroscale, is zone-melted in one direction. Most of the solute is then in the last zone where it freezes out according to the normal freezing relationship (Equation 1). If the bar is now zone-melted in the opposite direction, all but the last zone to be retraversed will be at fairly uniform concentration as shown in Fig. 7a, the mean concentration being less than $C_0$.

As may be seen from the plotted curves of Fig. 15 cropping up to at least 50 per cent of the solute in the last zone does not impair the uniformity of the solute distribution, while at the same time a refining effect is achieved. Cropping as high as 90 per cent of solute in the last zone still results in a fairly uniform solute distribution curve, while at the same time having a further effect of removing of the order of 90 per cent of the impurity present in the entire charge. A more exact procedure of obtaining a desired level of concentration, while at the same time maintaining constant solute distributions, is to remove the last zone entirely and to substitute a section of rod of the proper concentration before reverse zone-melting.

Substantially similar results have been obtained by first producing a bar by normal freezing in the forward direction and then zone-melting in the reverse direction, cropping portions of the last part of the normally frozen bar containing desired amounts of solute before zone-melting.

Figs. 16a and 16b are schematic and graphical representations of a product of a zone-melting process utilizing a two-solute system. The example depicted is a germanium alloy having a boron concentration, $\gamma_B C_B$, and an antimony concentration, $\gamma_{Sb} C_{Sb}$ in the solid. Traveling through this bar of uniform concentration is a molten zone of length L having the concentration $C_B$ and $C_{Sb}$. One way to obtain this condition will be either to run the zone over sufficient length of material to build up the concentration of the molten zone to the desired solute concentration (see discussion in connection with Figs. 4 and 5), to use the method of reverse zone-melting (Fig. 7a), zone-melting with starting charge (Figs. 7b, 8), or repeated zone passes (Fig. 12).

By changing the zone length L or the rate of motion of the zone as it travels, perturbations in concentration can be produced. Where the alloy chosen is a semiconductor, such as germanium, and where the two impurities are of different conductivity types as are boron, an acceptor, and antimony, a donor, the perturbation may manifest itself as a change in conductivity type. In the example chosen, since $\gamma_{Sb} C_{Sb}$ is greater than $\gamma_B C_B$, the bar is N-type and remains so as the zone traverses it at constant L. Sharply increasing L at $x_1$, brings the material over to P-type by causing $C_B$ to become greater than $C_{Sb}$ as shown in Fig. 16b. On this figure the solid curve A represents the concentration of antimony in the final bar while broken curve B represents the concentration of boron at corresponding points along the final bar. Decreasing L when the advancing solid reaches point $x_2$ will cause the concentration to shift in the opposite direction back to N-type. Thus, without any addition of significant impurity and starting with a rod of constant impurity distribution, P-N or N-P-N barriers may be formed.

By repeating the expansions and contractions of the zone as it travels along the bar a multiplicity of P-N or N-P-N barriers can be created in a bar without addition agents. As previously indicated, such perturbations can be made by varying the temperature of the zone, thereby varying the zone volume and, during the time the temperature is being so varied, changing the rate of advance of the freezing solid, and by varying the rate of travel of the zone. Also, by maintaining the zone length and travel rate relatively constant, perturbations of the P-N or N-P-N type can be made by having a varying cross-section in the starting body.

In the example chosen, an acceptor, boron, with a $\gamma$ value in germanium or silicon of more than 1 and a donor, antimony, with a $\gamma$ value in germanium or silicon of less than 1 have been chosen. This is favorable to attaining large shifts or perturbations in concentration. However, it is necessary only that the two $\gamma$'s differ in value (both may be greater than or less than 1) as long as one solute is an acceptor in the semiconductor chosen (a group III periodic table element if the semiconductor chosen is from group IV as, for example, germanium or silicon) and the other a donor (group V element under the above parenthetic conditions) to obtain a P-N conversion. If both $\gamma$'s are less than 1, then the concentrations of both solutes decrease as the zone length L is increased, but at different rates, so that an inversion of conductivity type becomes possible.

Wherever, in the description or claims of this invention, reference is made to the periodic table, it is intended that the table be that of the system of Mendelyeev.

Figs. 17a and 17b are schematic and graphical representations of a species of zone-melting, the product of which is herein referred to as a remelt junction. In illustrating this process, a germanium alloy containing both antimony, a donor, and a boron, an acceptor, has been chosen as an example. The ingot is first prepared so as to have a uniform concentration $C_{Sb}$ of antimony and $C_B$ of boron. (One of the methods above described is useful in this connection.) The ingot is then sawed up into blocks and a surface layer of one is melted. Fig. 17a is a front elevation of the upper right-hand corner of such a block in which the righthand face $a$ is melted until a molten layer or zone of depth L is produced. Then the molten alloy is allowed to freeze progressively in an outward direction toward surface $a$. The solute concentrations will vary in the manner shown in Fig. 17b. In this figure, the concentration of antimony follows the trend of the solid line A at the level of the antimony concentration in the starting material $C_{Sb}$ until the inward limit $x_1$ to which the molten zone was allowed to proceed, there dropping sharply to $\gamma_{Sb} C_{Sb}$ and thereafter freezing by normal freezing. (This latter portion curves upward to the right since the $\gamma$ of antimony in germanium is of a value less than 1.) At the same time the boron concentration as represented by broken curve B is following the trend through $C_B$, up to $\gamma_B C_B$ at $x_1$ and thereafter following a downward trend (since the $\gamma$ of boron in germanium is of a value greater than 1).

In this example, since $C_{Sb}$ was chosen to be greater than $C_B$, the block is originally all N-type. After the molten zone has proceeded to depth $x_1$ and freezing has begun, the solute concentrations of the refrozen solid at $x_1$ are $\gamma_{Sb} C_{Sb}$, and $\gamma_B C_B$ as shown. Since $\gamma_B C_B$ is greater than $\gamma_{Sb} C_{Sb}$ the germanium goes to P-type at $x_1$. The solute concentrations follow the trend discussed, crossing at $x_2$, thereby bringing the material back to N-type at that point. The concentration gradient at $x_2$ will be determined by the magnitudes of $C_{Sb}$, $C_B$, by distance $x_1 - S$, and by the respective $\gamma$'s. The result of the run depicted is a block of germanium containing an N-P-N transition region.

By melting a thin surface layer, in the range of mils in thickness, very thin P layers may be produced. Although changes in concentration at $x_1$ are independent of the amount of liquid melted, the thickness of the P layer will be dependent on this quantity. Junctions such as that at $x_1$ may be suitable for voltage-limiting devices of the Zener type, in which the limiting voltage is low, of the order of several volts. For a discussion of such devices see "Observations of Zener current in germanium PN junctions" by K. B. McAfee, E. J. Ryder, W. Shockley, M. Sparks; Physical Review, August 1, 1951.

The tapered P-region shown in Fig. 17b is particularly suited for increasing the frequency response of an N–P–N transistor, as, for example, a device of the type disclosed in United States Patent No. 2,569,347 issued September 25, 1951, to W. Shockley, by providing a built-in field which accelerates electrons toward the collector junction which would be at $x_2$.

It is also possible to create P–N junctions by a variation of the zone-melting with the starting-charge-only process discussed in connection with Fig. 7b by using two solutes, a donor and an acceptor having different $\gamma$'s. Reference to Fig. 10 readily shows that for $\gamma$ equal to 5 (the approximate value for boron in germanium) C decays rapidly and for $\gamma$ equal to .01 (antimony in germanium) C decays slowly. Hence, a starting change in which $\gamma_B C_{iB}$ is greater than $\gamma_{Sb} C_{iSb}$ will result in a P–N barrier.

For two solutes, 1 and 2, the barrier will occur at $$\left(\frac{X}{L}\right)_{PN}$$

given by the equation $$\left(\frac{X}{L}\right)_{PN} = \frac{2.303}{\gamma_2 - \gamma_1} \log k \qquad (8)$$

where $$k = \frac{\gamma_2 C_{i_2}}{\gamma_1 C_{i_1}}$$

and log $k$ is to the base 10.

An advantageous feature of this method is that the value of the concentration gradient at the P–N barrier is very easily controlled. If L is constant and solute 1 has a $\gamma$ of very low value, such as that of antimony in germanium, $C_1$ will decay slowly from its initial value. Hence, concentration gradients of such junctions will be essentially constant, and relatively independent of the location in the bar at which the junction forms. The location will vary according to Equation 8.

The concentration gradient of the difference-concentration $\Delta C$ will be:

$$\frac{d(\Delta C)}{dX} = \frac{C_1}{L}(\gamma_1 - \gamma_2)$$

where $\Delta C = C_2 - C_1$

The process above described can be adapted to the production of N–P–N junctions by the use of three impurities of different $\gamma$'s.

P–N and N–P–N junctions may be formed during any of the zone-melting processes above described by the use of doping. Means by which this doping are carried out are as follows:

(a) Adding significant solute to the molten zone by means of solid, liquid or vapor additive in pure, alloyed or compound form such that it will go into solution with the molten material.

(b) Precharging the bar with a pill, deposit or coating containing donor and/or acceptors placed so that solute is added at some desired point. When the pill enters the leading edge of the zone its effect is felt in the solid at the trailing edge. A series of pills may be used so as to produce any desired configuration of P–N regions.

(c) Initial material may consist of abutting bars alternately P- and N-type.

(d) The liquid zone may be doped by means of a gas containing a significant impurity in such form that the impurity will go into solution in the molten zone.

Another type of pill doping takes advantage of the fact that the value of $\gamma$ for boron in germanium is greater than 1. (Experiments indicate that it has a value of about 5.) A boron pill is introduced into a relatively small molten zone and immediately freezes out a high concentration $C_{boron}$ which drops sharply in value, as the zone advances, to a very low concentration. Thus a series of boron pills, preset in the charge, results in a series of N–P–N barriers when traversed by a molten zone if the rest of the material is N-type. This is the situation where the molten zone contains a sufficient amount of antimony in germanium. When a boron pill is reached, the freezing solid goes P-type but quickly returns to N-type due to the rapid decay of boron in germanium. Thus a series of N–P–N junctions can be made in a bar without need for cumulatively greater additions of donors and acceptors. The decay rate of a solute having a $\gamma$ value of 5 in a solute-solvent system is plotted on Fig. 10 (curve A). It is seen that, in a length of 0.1 zone length, C falls from 5 to 3, a drop of about 40 per cent.

Figs. 18a and 18b are schematic and diagrammatic representations of an alternate method of producing a segregation junction such as that discussed in connection with Figs. 17a and 17b. The remelt junction of Fig. 18a may be produced on the apparatus of Figs. 13a or 13b. The starting material for the process comprises a rod of a semiconductor alloy containing two or more significant impurity solutes. In the illustration chosen the alloy is that of antimony and gallium in germanium. The starting material, which may be produced for example by the zone melting process discussed in connection with Fig. 8, contains an essentially constant solute distribution for both significant impurities along its length. In the example chosen, the antimony impurity level is higher than that of the gallium in the initial material so that the starting material is N-type. The starting material is then placed in the zone melting apparatus and a zone of length L is formed at any desired location. Then, length L is decreased until the entire zone has refrozen. When the zone is refrozen toward the center from the extremities inwardly then the solutes redistribute themselves as shown in the diagram of Fig. 18b forming four P–N junctions. On this figure solid curve A represents the concentration of the antimony in the treated material while broken curve B represents that of gallium. It will be noted that the concentrations of both solutes are constant at $C_{Sb}$ and $C_{Ga}$ respectively to either side of the extremities of the refrozen zone. As the zone shrinks, the first solid frozen out at $e$ and $e_1$ has the concentrations $\gamma_{Sb} C_{Sb}$ and $\gamma_{Ga} C_{Ga}$. As freezing progresses, the concentration of antimony freezing out overtakes that of the gallium at $d$ and $d_1$ since $\gamma_{Sb}$ is less than $\gamma_{Ga}$ and since both are less than 1 (see Equation 1) so that the center portion of the refrozen zone again predominates in antimony. The end result, then, is an N-type rod with P-regions $e - d$ and $e_1 - d_1$ and P–N junctions at $e$, $d$, $e_1$ and $d_1$. Once again, the gradients at points $d$ and $d_1$ may be controlled simply by controlling the maximum length of zone L. The gradients at $e$ and $e_1$ may be controlled by varying the holding time when the zone has reached its maximum volume.

Figs. 19a and 19b are examples of remelt junctions similar to those produced by the process of Figs. 17a and 17b, except that in this case the gradients are modified and the resulting junctions produced by the addition of a pill containing one or more significant impurities. Fig. 19a is identical to Fig. 17a and represents a similar series of operations. In the example chosen the starting material has an antimony concentration $C_{Sb}$ which when molten has the effect of freezing out an initial concentration $\gamma_{Sb} C_{Sb}$. As in the process of Figs. 17a and 17b the surface of the block is first melted to the depth indicated after which the doping material containing the desired significant impurities is added. Alternately, the doping material is placed on the solid block and is melted in with the semiconductor during remelting. In connection with this method of obtaining transition regions, it should be noted that the gradients are produced by the redistribution of solute on freezing and are not directly produced by the addition of doping material. Timing is, therefore, not critical. As the surface is allowed to freeze outwardly the pill, which in the illustration chosen contains significant impurities boron and antimony, together with the antimony already present in the material, produces concentration curves A for boron and B for antimony, while the antimony originally present in the material would, in the absence of the impurities added by doping, have the effect on concentration shown by curve D (identical to the trend of curve A of Fig. 17b). All three curves in the refrozen region are normal freezing curves. Since the starting material was predominantly antimony before the pill was added, all of the material up to the limit of the molten zone is N-type. The next portion, that is, the inward portion of the molten zone, predominates in boron, which has a $\gamma$ value greater than 1 and which would therefore be concentrated in that portion of the molten zone which initially crystallizes. Therefore this portion of the remelt zone from the inward limit of the remelt zone and up to the point at which curve A intersects with curve B is P-type. Since from this intersection point up to the surface antimony again predominates, the remainder is N-type. The effect therefore of remelting the surface of this germanium alloy and of adding a pill which in this example contained a P-type impurity of $\gamma$ value of greater than 1 and an N-type impurity of a $\gamma$ value of less than 1 manifests itself as an N–P–N junction. This method has an additional advantage over the method of Figs. 17a and 17b in that a greater degree of control over the conductivities and the extents of the P and N-regions is afforded. Moreover, with a given starting material, a variety of P–N and N–P–N junctions can be prepared by suitably choosing the compositions and amounts of the additives.

While remelt junctions already described can produce P–N and N–P–N barriers of relatively large area, from which numbers of translating devices can be made, the process may also be used to produce such barriers in individual devices and in localized regions.

For example, a P–N hook collector (see United States Patent No. 2,569,347 of W. Shockley, issued September 25, 1951) can be made by touching a hot electrode-point of a metallic material to N-germanium of suitable composition, such that a local and more or less hemispherical region about the point becomes molten. Upon refreezing an N–P–N configuration can be produced about the electrode, which in addition becomes embedded in the germanium, as described in the copending applications of W. G. Pfann, Serial No. 68,596, filed December 31, 1948, and Serial No. 184,869, filed September 14, 1950. Suitable point materials are tungsten, tantalum and the iron-nickel alloys known as the Permalloys.

Other heating methods for forming thin and/or small area remelt regions are electron or ion discharges, or microwave power, directed at the surface in question.

Channels of different conductivity or conductivity-type than the main body of a semiconductor can be made by causing a heated member or electrical discharge to move across the surface.

A variation of zone-melting is to melt only partly through the cross-section of a bar and then to traverse the bar with a molten zone. In this manner, a P–N barrier extending the length of a bar can be made. This method is also useful for refining in cases where no suitable mold or crucible exists for the material being purified. For example, in the case of a bar of rectangular cross-section about ¼ inch by 1 inch held with its length and its 1 inch dimension in a horizontal plane, the upper half can be zone-refined, using the solid portions as support for the molten ones and then the bar can be turned over to zone-refine the (formerly) lower half.

Fig. 20 is a cross-sectional view of one type of apparatus which may be used in producing the junctions of Figs. 17a and 17b and 19a and 19b. In this figure it is seen that the atmosphere surrounding the material treated is controllable with a furnace container 29 which may be made of quartz or any other suitable material. In this instance heating is carried out by the use of an induction coil 30 although a resistance coil or a torch would be satisfactory. Induction coil 30 does not directly heat the material to be treated but rather raises the temperature of heater 31 which may be made of graphite and which is supported by support rods 32 which may be made of quartz. These quartz rods are embedded in a cooling base 33 which again may be composed of graphite. This cooling base may be externally cooled by cooling coils in the base, but may also simply act as a heat sink of itself. The material to be treated 34 is placed underneath heater body 31. It has been found advantageous to place quartz disc 35 on top of and quartz disc 36 beneath material 34, although the use of these discs is optional. The effect of both discs is to act as distributors of heat and junctions produced when the discs present are found to be substantially flatter than when they are not used. Upper disc 35 also holds the liquid flat and prevents surface tension from greatly altering the shape of the sample thereby improving control of uniformity of barriers and layers.

Where the body to be treated is germanium of dimensions in the range of 1 x 1 x .2 centimeter and where it is desired to remelt a thickness in the range of .02 inch, a quartz disc 35 about .062 inch thick has been found to be satisfactory. This disc should not be so heavy as to have the effect of forcing the molten portion of the body being treated over the edge of the solid portion. The atmosphere to be maintained inside of the furnace container 29 depends on the purpose desired. In the figure a hydrogen atmosphere is being maintained. Any other suitable non-reactive gas may, of course, be substituted for hydrogen. Where it is desired to effect the material being treated and where this may be accomplished by gas doping then, of course, this gas may be passed through the inlet in place of the hydrogen.

Remelt junctions may be formed also between two different semiconductors. For example, a piece of P-type germanium can be melted into a slab of N-type silicon and the melt then frozen progressively as in Figs. 17a, 17b, 18a, 18b, 19a and 19b.

Where it is desired to form single crystals of germanium by the zone-melting process, rates of zone travel of up to about .006 inch per second are used. At rates higher than .006 inch per second twinning or other crystalline deformation may result which is generally considered undesirable in single crystals of germanium intended for use in semiconductive devices. Preferably the rate at which the zone traverses the germanium is kept at from 0 to .003 inch per second where it is desired to form a single crystal.

The atmosphere which is to be maintained in the apparatus is a matter of choice and depends on the material being treated and the effect desired. Where it is intended that the atmosphere not affect the material under treatment, an inert gas or vacuum may be used. Where it is intended that solute be added to the material, and where the additive may be in the form of a gas, as in gas doping of semiconductive materials, the atmosphere composition is chosen accordingly. Recent work indicates that the amount of water vapor in the atmosphere has an effect on, and therefore, offers another means of control of the effective concentration of solute in some systems. Where the substance being treated is germanium, the temperature of the melting zone is maintained at from about 940° C. to 1000° C.

Using the processes above described, single crystals of germanium having essentially uniform solute distribution along their lengths and in cross-sections and evidencing uniform physical characteristics have been produced. Such crystals having diameters of from one-quarter of an inch up to 1 inch and up to 12 inches in length have been made. The only limitation on size is determined by apparatus design and amount of starting material. By using equipment of the design depicted in Fig. 13b, crystals of from one-eighth of an inch to more than an inch in diameter and of any practical length may readily be produced. Where it is desired to produce single crystals of uniform solute distribution with a minimum number of passes, the chief limitation aside from apparatus design is that of the raw material. With a starting material with a fairly uniform impurity level of desired resistivity on a macroscale, end product (single crystal if desired) may be turned out continuously by simply passing the material through the furnace or furnaces under the conditions above discussed.

In zone-melting semiconductive materials such as germanium in the apparatus of Fig. 13b and in zone-melting any material in any equipment where solute levels are low and critical, it is sometimes preferable to treat the surface of the starting body. Such processing by sandblasting or etching, to remove surface impurities may be helpful in zone-refining or other zone-melting process where it is desired to keep the solute level at a very low value.

Although it is not considered essential, seed crystals have been utilized in forming single crystals on the apparatus of Fig. 13b. Seed crystals of germanium from about one-eighth to 1 inch in diameter (shape is not considered critical) and having a 1-0-0 crystalline orientation aligned with the axis of the tube have been used with success.

It has been found that germanium adheres to fused quartz tubes. The sticking causes strains and lineage to be produced in the growing crystal. Any tendency there may be for the forming material to adhere to the inside surface of the quartz tube in the apparatus of Fig. 13b may be minimized by coating the form. One method which has met with a high degree of success is to form a carbonaceous layer on the inside of the tube by burning a paraffin candle at its lower end and sucking the flame into the tube by creating a vacuum at the other end. Such a precaution also eliminates the formation of gas bubbles on the lower surface of the rod wherever such a tendency may be present.

In zone-refining where polycrystalline end material is acceptable, for example in the process of Fig. 14a, the zone may, under certain conditions, be allowed to traverse the material at a more rapid rate than when single crystal material is desired. Using the equipment described for the purpose of zone-refining germanium, rates of up to 10 mils per second are usuable while rates of from about 0.5 to 5 mils per second are preferred. The upper limit on the rate at which the zone traverses the material where the crystalline structure of the end product is not material is the minimum rate which results in the formation of dendrites. Formation of dendrites results in the entrapment of the molten material and prevents solutes (for $\gamma$ values less than 1) from escaping into the main body of liquid. Even for a smooth interface between liquid and advancing solid, increasing the rate increases the effective value of $\gamma$ for $\gamma$ values less than one and decreases those of value, greater than 1 so that the effectiveness of refining is reduced. Decreasing the rate to too low a value may cause $\gamma$ to approach 1, due to diffusion in the solid, as discussed below, as well as resulting in a poorer yield of purified material per unit time due to the slow rate of passage of the zones. For a given process, therefore, an optimum rate exists which will provide greatest refinement in a given time. The rate considerations remain unchanged where it is the solute rather than solvent which it is desired to recover, that is, where the process is considered one of concentrating rather than refining.

Other factors which have an important influence on the percentage yield of material above or below a certain solute concentration are the size and number of the molten zones. Calculations based on Equation 7 readily show that, for a given length, T, of starting material, the minimum concentration of solute at the starting end for $\gamma$'s less than 1 decreases markedly as L, the zone length, decreases. (For $\gamma$'s greater than 1, the maximum concentration of solute increases as L decreases.) Hence, purification of a solvent or concentration of a desired solute is favored by small L. It is evident, also, that for small numbers of passes, of the order of about 1 to 10 the degree of separation of solute and solvent is less than for the ultimate case given by Equation 7, but approaches the ultimate case more closely with each successive passage of a molten zone through the material.

Thus, in considering a given refining process, there are three parameters of importance which can be adjusted so as to obtain optimum yield. These are the size, the number and the rate of travel of the zones.

Much of the above discussion and derivations have been based on the assumption that there is no diffusion of solute in the solid state. Where there is some slight diffusion in the solid, the following effects are noted:

(1) Where the objective of the zone-melting process is that of uniform solute distribution, in general, some diffusion in the solid will aid, that is to say, will have the effect of leveling out any solute gradients in the solid state.

(2) In zone-refining, since diffusion in the solid has the effect of increasing $\gamma$ where $\gamma$ is less than 1 and of decreasing $\gamma$ for values greater than 1 (as compared with those values which would be predicted from the equilibrium diagram), such deviation decreases the effect of zone-refining in separating solute from solvent and thereby lowering the efficiency of the molten zone as a collector in systems having solute $\gamma$ values of less than 1.

(3) Some diffusion of solute in the solid state may occur in forming remelt junctions as discussed in connection with Figs. 17a, 17b, 18a, 18b and 19a and 19b. Such deviation offers a means of controlling the concentration gradient of excess carriers at the P-N barrier since, where there is some diffusion in the solid state, the steepness of the gradient may be decreased by simply holding the liquid zone in contact with the solid for a longer period of time.

Using the zone-melting process, it is possible to produce a safety device in the following manner. In a solute-solvent system (where $\gamma$ is less than 1) the melted zone is richer in solute than is the solid. After sweeping the zone through the alloy and picking up most of the solute, the zone may then be stopped at some desired location in the bar and allowed to freeze. Where the alloy system is of the eutectic type with limited solubility in the solid (for example, lead-antimony), the eutectic mixture will be formed where the zone freezes.

Such a zone will be a location of lower melting point and lower strength than the rest of the bar and therefore such a bar can find use as a safety valve which would rupture at the weak point under some predetermined critical stress.

Similarly, with a magnetic alloy undergoing treatment which alloy's properties are functions of solute concentration, a region of high or low permeability or coercive force may be produced.

Although most of the above discussion relating to zone-melting has been in terms of its application to semiconductive systems such as germanium, together with any one of the common significant impurities, it may be applied to any other system in which the rate of diffusion in solid is low compared to that in the liquid. Examples of such systems are:

(1) Alloys of two or more metals.
(2) Alloys of metals and non-metals.

(3) Systems of salts and metals.

(4) Solid solutions of salts or oxides, with or without water of crystallization, for example, sodium chloride containing copper and potassium as impurities.

(5) Solid solution systems, including aqueous solutions, in which refrigeration is needed to produce the solid portions of the material.

(6) Zone-processes for distribution of solutes can be carried out using solid-solid systems in which a phase change occurs in the solid state with change of solute concentration, provided that the diffusivity of a solute is much greater in one phase than in the other. In such systems the solid phase of high diffusivity of solute would correspond to the liquid phase in solid-liquid systems.

The following are suggested methods for obtaining starting material having essentially no solute gradient on a macroscale:

(1) The first method of getting uniform compositions on a macroscale with localized or microsegregation but no end-to-end segregation, which method is known as "chill casting," is to melt or pour molten alloy into a mold, while cooling it rapidly from the sides inward. Such a process results in the formation of a large number of closely packed dendrites which entrap the liquid and prevent large scale segregation. For further details on chill casting see "Principles of Metallography" by R. F. Williams and V. O. Homerberg, page 190 (1935), McGraw-Hill Book Company, New York.

(2) An alternate method is to compose the starting material of wires or rods of the pure constituents of a desired alloy, the length of the wires or rods being that of the mold and their total cross-sectional area being apportioned between the constituents so as to give the desired alloy composition. Thus, for example, a binary alloy of wires or rods of the pure metal, the total cross-section of each being chosen to give the desired composition. Thus the mean concentration for any cross-section along the bar is constant.

(3) The constituents may be crushed or powdered or in the form of small crystals and may be thoroughly mixed to provide a mixture which is uniform on a macroscale.

Recent experimentation on semiconductive materials, such as germanium and silicon, has demonstrated that zone-melting has a further important advantage as applied to these materials. It has been demonstrated experimentally that multiple refining or recrystallization improves the lifetime of injected carriers. A discussion of the terms "lifetime" and "injected cariers" and their significance in semiconductors is given in "Electrons and Holes in Semiconductors" by W. Shockley, D. Van Nostrand, 1950.

Lifetimes of from 400 up to over 1000 microseconds have been obtained in germanium processed by the multiple zone-refining process of Figs. 14a and 14b. It should be noted that although most of the above discussion in regard to zone-refining has been with the aim of obtaining pure solvent, another possibility exists. Multiple zone-refining does not remove solute from the initial material but rather forms a steep concentration gradient extending through the length of the bar or charge. However, the possibility exists that the chief interest will lie in recovering the solute "impurity." If so, all the above considerations apply and that portion of the material which would be discarded in zone-refining, that is, one or other extremity of the finished material is considered the end product.

As stated above the zone-melting processes are particularly adaptable to the production of alloys intended for use in semiconductive devices. Examples of significant solutes in semiconductors of group IV of the periodic table according to Mendelyeev such as, for example, germanium and silicon include acceptors boron, gallium, indium, thallium and aluminum of group III and donors antimony, arsenic, bismuth and phosphorus of group V.

Where it is desired to produce a finished product having a certain predetermined impurity level and uniform solute distribution by the process of Fig. 9, the following illustrative calculation will indicate how the amount of starting charge may be determined.

*Illustrative calculation 1*

Let the starting material be in the form of a rod of germanium of cross-section 1 square centimeter and 10 centimeters long. With a zone length equal to 1 centimeter the volume of the zone will be 1 cubic centimeter. To produce aproximately $10^{16}$ atoms of antimony per cubic centimeter in the finished bar, it is necessary to add $$\frac{10^{16}}{\gamma_{Sb}}$$

atoms of antimony in the first zone in accordance with Equation 2. Since $\gamma_{Sb}$ for germanium equals about .007, it is necessary to add 1.42 times $10^{18}$ atoms of antimony to the first zone (or $2.9 \times 10^{-3}$ grams of antimony). This may be added directly or in the form of any alloy or substance which will have the effect of adding antimony to the bar. The resistivity of such a bar will be about 0.2 ohm-centimeter.

Using a modification of the zone-melting process as discussed in connection with Figs. 17a and 17b, it is possible to produce a P–N or N–P–N boundary without the use of any addition. The type of location of boundaries which may be expected by the use of this modification will become apparent by reference to the following calculation:

*Illustrative calculation 2*

Any of several zone-melting methods described herein will provide a block of homogeneous alloy of concentrations:

$C_{antimony} = 1.6 \times 10^{17}$ atoms per cubic centimeter of germanium $C_{gallium} = 0.8 \times 10^{17}$ atoms per cubic centimeter of germanium.

Assuming such concentrations the block will be N-type of a concentration excess of $0.8 \times 10^{17}$ atoms per cubic centimeter or of resistivity approximately equal to 0.023 ohm-centimeter.

Upon remelting in accordance with the process of Figs. 17A and 17B to any desired depth, the first solid to refreeze will have the concentrations:

$$\gamma_{Sb}C_{Sb} = (\sim 0.007)(1.6 \times 10^{17}) = 1.1 \times 10^{15}$$
$$\gamma_{Ga}C_{Ga} = (\sim 0.125)(8 \times 10^{16}) = 1.0 \times 10^{16}$$

and the difference concentration:

$$\Delta C = (1.0 - 0.1) \times 10^{16} = 9 \times 10^{15}$$

which is equivalent to a resistivity of about 0.42 ohm-centimeter. In this manner a P–N barrier with the indicated resistivities on either side has been produced. Using the assumed values the conductivity-type will revert to N-type near the surface during solidification of the melted portion but this N region can be removed by mechanical or chemical means if a P–N rather than an N–P–N transition region is desired.

Using the zone-melting process of Figs 17A and 17B the product of which has herein been described as a "remelt junction" together with the use of an addition, it is possible to increase the variety and ranges of conductivities in junctions obtained from a given starting material. The following calculation will demonstrate how such a junction may be formed:

*Illustrative calculation 3*

Let the starting material be a block of germanium-antimony alloy of dimensions of about 1 x 1 x 0.3 centimeters and having an antimony concentration of $10^{16}$ atoms per cubic centimeter of germanium. Upon remelting and refreezing part of the block, the concentration of all of the remelt layer with the exception of the portion immediately adjacent to the surface of the block will drop to a concentration of the order of $\gamma_{Sb} C_{Sb}$ equal to about $7 \times 10^{13}$ atoms per cubic centimeter, which is negligible.

In order to product a remelt volume $V_L$ equal to 0.05 cubic centimeter the depth of the remelt zone shall be 0.05 centimeter. Before remelting this layer a pill (or pills) containing boron or antimony alloyed with germanium is placed on the surface of the block. The boron and antimony dissolve into the remelt zone upon heating (of course this doping step can be by means of any known procedure such, for example, as gas or liquid doping).

Let $C_2$ = concentration of boron which will freeze out when refreezing begins, and
$C_3$ = concentration of antimony which will freeze out when refreezing begins.

Let $C_2 = 10^{16}$ atoms per cubic centimeter and
$C_3 = 5 \times 10^{15}$ atoms per cubic centimeter.

The first solid to refreeze will have an excess of boron of $1 \times 10^{16} - 5 \times 10^{15}$ atoms per cubic centimeter Where the above is the excess impurity desired, it may be determined how much boron and antimony it will be necessary to have alloyed in the starting pill in the following manner:

Grams of boron in pill $$= \left(\frac{C_2}{\gamma_{Sb}}\right)(V_L)\left(\frac{\text{atomic weight B}}{\text{Avogadro's number}}\right)$$

$$= \left(\frac{10^{16}}{\sim 5}\right)(.05)\frac{10.8}{6.03 \times 10^{23}}$$

$$= 1.79 \times 10^{-9} \text{ grams}$$

Grams of antimony in pill $$= \left(\frac{C_3}{\gamma_{Sb}}\right)(V_L)\left(\frac{\text{atomic weight}}{\text{Avogadro's number}}\right)$$

$$= \left(\frac{5 \times 10^{15}}{0.007}\right)\left(\frac{0.05}{6.03}\right)\left(\frac{121.8}{10^{23}}\right)$$

$$= 7.2 \times 10^{-6} \text{ grams}$$

Since the first material to refreeze is P-type as shown by the excess of boron over antimony, a P–N barrier is formed at the remelt boundary. A second P–N barrier forms by differential segregation. This second P–N barrier may be located by the following calculation:

$$X_{PN} = 1 - K^{\left(\frac{1}{\gamma_1 - \gamma_2}\right)}$$

where:

$\gamma_1$ is $\gamma$ for antimony
$\gamma_2$ is $\gamma$ for boron $$X_{PN} = 1 - 2^{\left(\frac{1}{0.007 - 5}\right)}$$

$= 0.13$ of the fraction solidified

Since the length of the freezing zone is equal to 0.05 centimeter or 0.02 inch, the P–N boundary will occur at:

$X_{PN} = 0.13 \times 0.02$ $= 0.0026$ inch from the boundary of the remelt zone.

In other words, a P-layer about 0.0026 inch wide is formed between two N-layers.

*Illustrative calculation 4*

In the preceding illustrative example a higher initial concentration of antimony in the starting material would have obviated the need for adding antimony to the remelt zone. For example, starting with an initial concentration of antimony of about $1.4 \times 10^{17}$ atoms per cubic centimeter, upon remelting this falls to about $\gamma C_1 = .007 \times 1.4 \times 10^{17}$, or about $1 \times 10^{15}$ atoms per cubic centimeter at the remelt junction on refreezing. When a boron pill made of a boron-germanium alloy containing about $6 \times 10^{17}$ atoms boron per cubic centimeter and .0058 gram in weight is melted into a remelted liquid of volume $V_L$ equal to about 0.12 cubic centimeter (depth of remelt zone=0.12 cm., area=1 cm.²), a P-layer of the order of .006 inch in thickness is obtained after solidification. Tests of $\alpha$, the current multiplication factor (see W. Shockley, United States Patent No. 2,569,347, issued September 25, 1951) upon transistors made from such junctions have shown values of 0.9 and higher, the theoretical maximum value being 1.

What is claimed is:

1. A method of producing a body of fusible extrinsic semiconductive material containing at least one significant minor ingredient and in which the said significant minor ingredient has some desired distribution along the length of said body, which method comprises establishing in said body a molten zone and further causing said zone to traverse at least a portion of said body by progressively melting the material of said body at one interface of said zone and progressively freezing the material of said zone at another interface of said zone, the said significant minor ingredient being soluble to some extent in the said fusible extrinsic semiconductive material in both the solid and the molten phases and the concentrations of the said minor ingredient being different in adjoining solid and molten phases at equilibrium.

2. A method of producing controlled distribution of at least one significant minor ingredient in a body of a fusible extrinsic semiconductive solid containing said at least one significant minor ingredient, which method comprises establishing in said body a molten zone and causing at least on solid liquid interface between said zone and the solid portion of said body to progress by melting the solid at said at least one solid liquid interface and causing at least one solid liquid interface between said zone and said solid portion to progress by progressively freezing out solid, the said significant minor ingredient being soluble to some extent in the said fusible extrinsic semiconductive material in both the solid and the molten phases and the concentrations of the said significant minor ingredient being different in adjoining solid and molten phases at equilibrium.

3. A method of producing controlled distribution of at least one significant minor ingredient in a body of a fusible extrinsic semiconductive solid containing at least one significant minor ingredient, which method comprises establishing in said body a molten zone and causing at least one solid liquid interface between said zone and the solid portion of said body to progress by melting the solid at said at least one solid liquid interface, causing at least one other solid liquid interface to progress by progressively freezing out solid at said at least one other solid liquid interface, the said starting material having the aforesaid at least one significant minor ingredient substantially uniformly distributed on a microscale in the direction in which the zone interfaces are caused to progress, and the said significant minor ingredient being soluble to some extent in said extrinsic semiconductive material in both the solid and the molten phases and the concentrations of the said minor ingredient being different in adjoining solid and molten phases at equilibrium.

4. A method of producing, in a body of fusible solid containing a minor ingredient, uniform distribution of said minor ingredient on a microscale over a substantial portion of its volume, which method comprises establishing in said body a molten zone extending across its cross-section and causing said zone to move progressively without substantial change of volume through said body in one direction by progressively melting solid at one solid liquid interface and by progressively freezing out solid at the other interface at the same rate, the molten zone being of such volume that the concentration of said minor ingredient attains a value of $$\frac{C_0}{\gamma}$$

before said molten zone completely traverse said body in its direction of travel, where $C_0$ is the average concentration of said minor ingredient in said body and $\gamma$ is the proportionality constant equal to the ratio of the concentration of said minor ingredient in the solid to that in the liquid, and the said minor ingredient being soluble to some extent in the fusible material in both the solid and the molten phases and the concentrations of the said minor ingredient being different in adjoining solid and molten phases at equilibrium.

5. A method as defined in claim 4, wherein the fusible solid is an alloy containing as a major ingredient an element selected from the group consisting of silicon and germanium and wherein the minor ingredient is an element from group III of the periodic table.

6. A method as defined in claim 4, wherein the fusible solid is an alloy containing as a major ingredient an element selected from the group consisting of silicon and germanium and wherein the minor ingredient is an element from group V of the periodic table.

7. A method as defined in claim 4 wherein the fusible solid is an alloy of germanium, wherein the minor ingredient is an element selected from the group consisting of boron, gallium, indium, aluminum, thallium, antimony, arsenic, bismuth and phosphorus, and wherein said zone is caused to move progressively without substantial change of volume through said body at a rate of up to 0.006 inch per second.

8. A method of treating a body of fusible solid containing a minor ingredient to produce uniform distribution of said minor ingredient on a microscale over a substantial portion of the volume of said body, which method comprises establishing substantially at the extremity of said body a molten zone and causing said zone to move progressively without substantial change in volume through said body in one direction by progressively melting the solid at one solid liquid interface while progressively freezing out solid at the other interface at the same rate, then causing said zone to move progressively without substantial change in volume through said body in the other direction by progressively melting the solid at one solid liquid interface while progressively freezing out solid at the other interface at the same rate, the molten zone being of such volume that the concentration of said minor ingredient attains the value of $$\frac{C_f}{\gamma}$$

before said molten zone completely traverses said body in its reverse direction of travel where $C_f$ is the average concentration of said minor ingredient in the solid portion of said body and $\gamma$ is the proportionality constant equal to the ratio of the concentration of said minor ingredient in the solid to that in the liquid, and the said minor ingredient being soluble to some extent in the fusible material in both the solid and the molten phases and the concentrations of the said minor ingredient being different in adjoining solid and molten phases at equilibrium.

9. A method as defined in claim 8 wherein the fusible solid is an alloy containing as a major ingredient an element selected from the group consisting of silicon and germanium and wherein the minor ingredient is an element selected from the group consisting of boron, gallium, indium, aluminum, thallium, antimony, arsenic, bismuth and phosphorus.

10. A method of treating a body of a fusible solid containing a minor ingredient to produce uniform distribution of said minor ingredient on a microscale over a substantial portion of the volume of said body, which method comprises establishing in said body a molten zone, adding to said molten zone an amount of the minor ingredient sufficient to cause the concentration of said minor ingredient in said molten zone to attain the value of $$\frac{C_0}{\gamma}$$

causing said zone to move progressively without substantial change of volume through said body in one direction by progressively melting the solid at one solid-liquid interface while progressively freezing out solid at the other interface at the same rate where $C_0$ is the average concentration of said minor ingredient in said body and $\gamma$ is the proportionality constant equal to the ratio of the concentration of said minor ingredient in the solid to that in the liquid, and said minor ingredient being soluble to some extent in the fusible material in both the solid and the molten phases and the concentrations of the said minor ingredient being different in adjoining solid and molten phases at equilibrium.

11. A method of producing, in a body of a fusible solid containing at least two minor ingredients, uniform distribution of said ingredients on a microscale over a substantial portion of the volume of said body, which method comprises establishing in said body a molten zone, adding to said molten zone an amount of said at least two minor ingredients sufficient to cause the concentrations of each of said at least two minor ingredients in said molten zone to attain the value of $$\frac{C_0}{\gamma}$$

causing said zone to move progressively without substantial change of volume through said body in one direction by progressively melting the solid at one solid-liquid interface while progressively freezing out solid at the other interface at the same rate, where $C_0$ for each of said minor ingredients is the average concentration of said minor ingredient in said body and $\gamma$ for each of said minor ingredients is the proportionality constant equal to the ratio of the concentration of said minor ingredient in the solid to that in the liquid, and the said minor ingredients being soluble to some extent in the fusible material in both the solid and the molten phases and the concentrations of the said minor ingredients being different in adjoining solid and molten phases at equilibrium.

12. A method of producing, in a body of a fusible solid, uniform distribution of a minor ingredient on a microscale over a substantial portion of its volume, which method comprises establishing in a substantially pure body of the major ingredient a molten zone, adding to said molten zone a minor ingredient and causing said zone to move progressively without substantial change in volume through said body by progressively melting the solid at one solid-liquid interface and while progressively freezing out solid at the other interface at the same rate, and the said minor ingredient being soluble to some extent in the fusible material in both the solid and the molten phases and the concentrations of the said minor ingredient being different in adjoining solid and molten phases at equilibrium.

13. A method of treating a body of a fusible solid containing at least one minor ingredient which method comprises establishing in said body at least two molten zones and causing said zones to move progressively through said body by progressively melting solid at one solid-liquid interface of each of said zones and progressively freezing out solid at the other interface of each of said zones, and the said minor ingredient being soluble to some extent in the fusible material in both the solid and the molten phases and the concentrations of the said minor ingredient being different in adjoining solid and molten phases at equilibrium.

14. A method of treating a body of a fusible solid containing a minor ingredient to produce uniform distribution of said minor ingredient on a microscale over a substantial portion of its volume, which method comprises establishing in said body a molten zone and causing said zone to travel progressively without substantial change of its volume through said body over a continuous route such that the molten zone at the termination of a first cycle of travel will reach its initial position and such that during the course of said cycle substantially all of the body will at some time be molten, the molten zone being of such volume and the time of treatment being such that the concentration of said minor ingredient in the molten zone ultimately achieves and stays constant at the value $$\frac{C_f}{\gamma}$$

and at which value said zone traverses substantially all of the body being treated, where $C_f$ is the average concentration of said minor ingredient in the solid portion of said body and in which $\gamma$ is the proportionality constant equal to the ratio of the concentration of said minor ingredient in the solid to that in the liquid, and the said minor ingredient being soluble to some extent in the fusible material in both the solid and the molten phases and the concentrations of the said minor ingredient being different in adjoining solid and molten phases at equilibrium.

15. A method of treating a body of an alloy of germanium containing at least one minor ingredient selected from the group consisting of boron, gallium, indium, aluminum, thallium, antimony, arsenic, bismuth and phosphorus to produce a body having uniform distribution of said at least one minor ingredient on a microscale over a substantial portion of its volume, which method comprises shaping said body substantially into a form of a ring, establishing in said body a molten zone and causing said zone to move progressively without substantial change in volume through said body in one direction around the ring by progressively melting the solid at one solid-liquid interface while progressively freezing out solid at the other interface at the same rate, said zone moving constantly at a rate of up to about 0.006 inch per second, and causing said molten zone to continually traverse said body until the concentration of said minor ingredient in said molten zone achieves and maintains the value $$\frac{C_f}{\gamma}$$

for each minor ingredient for at least one complete cycle of travel around said ring, where $C_f$ is the average concentration of each minor ingredient in the solid portion of said body and $\gamma$ is the proportionality constant equal to the ratio of the concentration of each minor ingredient in the solid to that in the liquid.

16. A method comprising establishing a molten zone in a substantially pure body of a fusible solid substance, adding a minor ingredient to said molten zone and causing said zone to move progressively through said body by progressively melting the solid at one solid-liquid interface while progressively freezing out solid at the other interface, and the said minor ingredient being soluble to some extent in said fusible substance in both the solid and the molten phases and the concentrations of the said minor ingredient being different in adjoining solid and molten phases at equilibrium.

17. A method of producing a body of a fusible solid having uniform distribution of a minor ingredient on a microscale over a substantial portion of its volume, which method comprises establishing in a substantially pure body of the major ingredient a molten zone, adding said minor ingredient to said molten zone and causing said zone to move progressively through said body by progressively melting the solid at one solid-liquid interface while progressively freezing out solid at the other interface and continuously varying the volume of the molten zone, and the said minor ingredient being soluble to some extent in said major ingredient in both the solid and the molten phases and the concentrations of the said minor ingredient being different in adjoining solid and molten phases at equilibrium.

18. A method of treating a body of a fusible solid containing a minor ingredient to produce a body having the major portion of said minor ingredient concentrated in some portion of the body, which method comprises establishing in said body at least one molten zone extending across its cross-section and causing said zone to move progressively through said body in one direction by progressively melting the solid at one solid-liquid interface while progressively freezing out solid at the other interface, thereafter at least once allowing a molten zone to traverse the body in the initial direction while at the same time maintaining the aforesaid conditions, and the said minor ingredient being soluble to some extent in the fusible material in both the solid and the molten phases and the concentrations of the said minor ingredient being different in adjoining solid and molten phases at equilibrium.

19. A method as defined in claim 18 wherein the fusible solid contains as the major ingredient an element selected from the group consisting of silicon and germanium and wherein the minor ingredient is an element selected from the group consisting of boron, gallium, indium, aluminum, thallium, antimony, arsenic, bismuth and phosphorus.

20. A method as defined in claim 19 wherein the fusible solid contains germanium as the major ingredient and wherein the zone traverses the body at a substantially constant rate of up to 0.006 inch per second during its final retraversal.

21. A method of producing a body of a fusible solid having a controlled concentration gradient of at least one minor ingredient, the cross-sectional distribution of said minor ingredient in said body being uniform on a microscale, which method comprises establishing in said body a molten zone and causing said zone to move progressively, while changing its volume, through said body by progressively melting the solid at one solid-liquid interface while progressively freezing out solid at the other interface at a different rate, and the change in volume of the said solid being in addition to the change which takes place during the establishing of the molten zone and the final removal of the molten zone, the said minor ingredient being soluble to some extent in the fusible material in both the solid and the molten phases and the concentrations of the said minor ingredient being different in adjoining solid and molten phases at equilibrium.

22. A method of treating a body of a semiconductor alloy, the conductivity type and resistivity of which are determined by significant solutes, which semiconductor alloy contains at least one such significant solute, to produce controlled resistivity and resistivity gradients at any desired portion, which method comprises establishing in said body a molten zone and causing said zone to move progressively, while changing its volume, through said body by progressively melting the solid at one solid-liquid interface and progressively freezing out solid at the other interface at a different rate, and the change in volume of the said solid being in addition to the change which takes place during the establishment of the molten zone and the final removal of the molten zone, the said significant solute being soluble to some extent in the said semiconductor alloy in both the solid and the molten phases and the concentrations of the said significant solute being different in adjoining solid and molten phases at equilibrium.

23. A method of treating a body of a semiconductive alloy the major ingredient of which is selected from the group consisting of silicon and germanium and which contains at least one donor and at least one acceptor, which method comprises establishing in said body a molten zone and causing said zone to move progressively, while at least once sharply varying its volume, through said body by progressively melting the solid at one solid-liquid interface while progressively freezing out solid at the other interface.

24. A method of treating a semiconductive body of a germanium alloy of a donor and an acceptor, which method comprises producing in said body a molten zone extending across its cross-section and causing said zone to move progressively by melting solid at one solid-liquid interface and freezing out solid at the other interface while at least once sharply varying the volume of the molten zone in one direction and subsequently at least once sharply varying the volume of the molten zone in the other direction.

25. A method of treating a body comprising a semiconductive alloy containing a fusible extrinsic semiconductive material as major ingredient and containing as minor ingredients at least one donor and at least one acceptor, which method comprises establishing in said body a molten zone and causing said zone to expand progressively through said body in at least one direction by progressively melting the solid at at least one solid-liquid interface and subsequently allowing said zone to contract by progressively freezing out solid at at least one interface and in which the concentrations of said minor ingredients in said starting material are uniformly distributed on a macrosale throughout the body in the direction in which the molten zone is allowed to expand, and the said minor ingredient being soluble to some extent in the said semiconductive alloy in both the solid and the molten phases and the concentrations of the said minor ingredients being different in adjoining solid and molten phases at equilibrium.

26. A method of treating a body of a fusible solid to produce non-uniform controlled distribution of at least one minor ingredient in a desired portion of its volume, which method comprises establishing in said body a molten zone causing said zone to expand progressively in volume through said body in at least one direction by progressively melting the solid at at least one solid-liquid interface until the desired portion of the body is molten, some time during the above said growth of said zone adding said at least one minor ingredient in such form that it will go into solution in said molten zone and subsequently causing said zone to contract by progressively freezing out solid at at least one solid-liquid interface until the entire body is again solid, and the said minor ingredient being soluble to some extent in the fusible material in both the solid and the molten phases and the concentrations of the said minor ingredient being different in adjoining solid and molten phases at equilibrium.

27. A method as defined in claim 26 wherein the fusible solid is an intrinsic semiconductor and wherein the at least one minor ingredient is a significant solute.

28. A method as defined in claim 27 wherein the fusible solid is an alloy of germanium and wherein the significant solute is an element selected from the group consisting of boron, gallium, indium, aluminum, thallium, antimony, arsenic, bismuth and phosphorus.

29. The method of claim 2 in which the body of fusible extrinsic semiconductive solid contains at least two minor ingredients, in which the said two minor ingredients are significant solutes and in which method at least one of the said solid liquid interfaces is caused to progress at a variable rate, such that the concentrations of the said two minor ingredients in the treated fusible extrinsic semiconductive solid are graded in the direction of progression of the said at least one of the said solid-liquid interfaces corresponding in position with the position of variable progression rate and such that the treated body contains a resistivity gradient corresponding in position to each position of graded concentration of either minor ingredient.

30. The method of producing controlled distribution of at least one significant solute in a body of fusible extrinsic semiconductive solid containing at least two significant solutes, which method comprises establishing in said material a solid-liquid interface, and causing said solid-liquid interface to progress at a variable rate, by progressively freezing out solid, such that a preponderance of first one significant solute and then a second significant solute is produced in the freezing portion, and such that there is produced within the said body of fusible extrinsic semiconductive solid a P–N junction in a position intermediate the position of preponderance of the one significant solute and the position of preponderance of the second significant solute, the said two significant solutes being soluble to some extent in the fusible extrinsic semiconductive material in both the solid and the molten phases and the concentrations of the said significant solutes being different in adjoining solid and liquid phases at equilibrium.

31. The method of claim 25 in which the said major ingredient is selected from the group consisting of silicon and germanium.

References Cited in the file of this patent
UNITED STATES PATENTS

| | | |
|---|---|---|
| 1,738,307 | McKeehan | Dec. 3, 1929 |
| 1,826,355 | Lincoln | Oct. 6, 1931 |
| 2,125,172 | Kinzel | July 26, 1938 |
| 2,576,267 | Scaff et al. | Nov. 27, 1951 |
| 2,631,356 | Sparks et al. | Mar. 17, 1953 |

OTHER REFERENCES

Andrade and Roscoe: Proc. Physical Society, vol. 49, pages 153–157.